(12) United States Patent
Johnson et al.

(10) Patent No.: US 11,479,080 B2
(45) Date of Patent: Oct. 25, 2022

(54) HYBRID ENERGY POWER MODULE FOR MOBILE ELECTRICAL DEVICES

(71) Applicant: Systematic Power Manufacturing, LLC, Knoxville, TN (US)

(72) Inventors: Scottie Johnson, Knoxville, TN (US); Eric C. Ricker, Knoxville, TN (US); Robert J. Wood, Sr., Oneonta, NY (US); Chad E. Hall, Oneonta, NY (US); Bryce Gregory, Oneonta, NY (US); Luke Yetto, Oneonta, NY (US); Daniel A. Patsos, Oneonta, NY (US); Joseph Agrelo, Oneonta, NY (US)

(73) Assignee: Systematic Power Manufacturing, LLC, Knoxville, TN (US)

( * ) Notice: Subject to any disclaimer, the term of this patent is extended or adjusted under 35 U.S.C. 154(b) by 0 days.

(21) Appl. No.: 17/379,473

(22) Filed: Jul. 19, 2021

(65) Prior Publication Data

US 2021/0347225 A1 Nov. 11, 2021

Related U.S. Application Data

(63) Continuation-in-part of application No. 16/352,555, filed on Mar. 13, 2019, now Pat. No. 11,069,488.
(Continued)

(51) Int. Cl.
*B60H 1/00* (2006.01)
*H01G 11/08* (2013.01)
(Continued)

(52) U.S. Cl.
CPC ....... *B60H 1/00428* (2013.01); *B60H 1/3226* (2013.01); *H01G 11/08* (2013.01);
(Continued)

(58) Field of Classification Search
CPC .............. B60H 1/00428; B60H 1/3226; B60H 1/3232; H01G 11/08; H01G 11/82;
(Continued)

(56) References Cited

U.S. PATENT DOCUMENTS 6,765,312 B1 7/2004 Urlass et al.
7,119,518 B1 10/2006 Dougherty et al.
(Continued)

FOREIGN PATENT DOCUMENTS

CN 205178537 U 4/2016
CN 106100091 A 11/2016

OTHER PUBLICATIONS

International Search Report and Written Opinion of the International Searching Authority in related International Application No. PCT/US2021/047121; dated Jan. 28, 2022; 14 pages.
(Continued)

*Primary Examiner* — Jared Fureman
*Assistant Examiner* — Michael J Warmflash
(74) *Attorney, Agent, or Firm* — Peter L. Brewer; Thrive IP

(57) ABSTRACT

A power generation system for a mobile device. The power generation system includes a combustion engine. The combustion engine serves as a power generator for the mobile device, with the combustion engine being located on a trailer. The power generation system also includes a power module. The power module comprises both an ultra-capacitor and a lithium-based battery; Preferably, the ultra-capacitor comprises a series, or bank, of super capacitors. Likewise, the battery comprises a series of lithium batteries. Preferably, the super capacitors are in electrical communication with an alternator of a truck. The power module provides power to start the combustion engine used to drive the mobile device. The mobile device may be a refrigeration
(Continued)

system, or may be heaters, blowers, lights or other electrical items that may be carried on the trailer.

42 Claims, 11 Drawing Sheets

Related U.S. Application Data

(60) Provisional application No. 63/209,848, filed on Jun. 11, 2021, provisional application No. 62/747,902, filed on Oct. 19, 2018.

(51) Int. Cl.
*H01M 10/0525* (2010.01)
*H02J 7/34* (2006.01)
*B60H 1/32* (2006.01)

(52) U.S. Cl.
CPC ......... *H01M 10/0525* (2013.01); *H02J 7/345* (2013.01); *B60L 2200/28* (2013.01)

(58) Field of Classification Search
CPC .............. H01G 11/10; H01M 10/0525; H01M 2220/20; H01M 12/00; H02J 7/345; H02J 2310/48; H02J 1/122; H02J 7/0068; H02J 7/1423; H02J 7/1438; B60L 2200/28; Y02T 10/70; Y02T 10/88; Y02E 60/10; Y02E 60/13
See application file for complete search history.

(56) References Cited

U.S. PATENT DOCUMENTS

| | | | |
|---|---|---|---|
| 7,193,390 B2 | 3/2007 | Nagai et al. | |
| 7,362,005 B2 | 4/2008 | Leblanc | |
| 7,548,409 B2 | 6/2009 | Kojima et al. | |
| 7,628,028 B2 | 12/2009 | Tolbert, Jr. et al. | |
| 7,667,432 B2 | 2/2010 | West et al. | |
| 7,782,016 B2 | 8/2010 | Kang et al. | |
| 7,887,943 B2 | 2/2011 | Yoshikane et al. | |
| 7,944,080 B2 | 5/2011 | Ishizeki | |
| 7,946,123 B2 | 5/2011 | Tolbert, Jr. et al. | |
| 8,264,333 B2 | 9/2012 | Blaker et al. | |
| 8,305,733 B2 | 11/2012 | Chan et al. | |
| 8,314,578 B2 | 11/2012 | Namuduri et al. | |
| 8,379,367 B2 | 2/2013 | Oh et al. | |
| 8,792,224 B2 | 7/2014 | Kim et al. | |
| 8,860,244 B2 | 10/2014 | Hattori | |
| 9,272,627 B2 | 3/2016 | Miller | |
| 9,300,018 B2 | 3/2016 | Watson et al. | |
| 9,415,690 B2 | 8/2016 | Ferrer-Dalmau Nieto et al. | |
| 9,562,715 B2 | 2/2017 | Kandasamy | |
| 9,627,908 B2 | 4/2017 | Kaminsky et al. | |
| 9,666,860 B2 | 5/2017 | Lam et al. | |
| D792,847 S | 7/2017 | Stone et al. | |
| 9,803,609 B2 | 10/2017 | Setterberg et al. | |
| 9,833,223 B2 | 12/2017 | Wood et al. | |
| 9,911,541 B2 | 3/2018 | Wang et al. | |
| 9,991,060 B2 | 6/2018 | Bouchard et al. | |
| 10,000,125 B2 | 6/2018 | Choi | |
| 10,023,065 B2 | 7/2018 | Huang et al. | |
| 10,024,408 B2 | 7/2018 | Johnson | |
| 10,029,572 B2 | 7/2018 | Sakatani et al. | |
| 10,119,514 B2 | 11/2018 | Averbukh et al. | |
| 10,153,096 B2 | 12/2018 | Xi et al. | |
| 10,158,152 B2 | 12/2018 | Watson et al. | |
| D840,340 S | 2/2019 | Suszko et al. | |
| 10,240,847 B1* | 3/2019 | Thomas, Jr. .......... | F25D 11/003 |
| 10,278,681 B2 | 5/2019 | Wood et al. | |
| 10,297,572 B2 | 5/2019 | Dalal et al. | |
| 10,297,885 B2 | 5/2019 | Gayden et al. | |
| 10,319,536 B1 | 6/2019 | Achrekar | |
| 10,523,019 B2 | 12/2019 | Rohera | |
| 10,551,104 B2 | 2/2020 | Kandasamy | |
| 10,668,825 B2* | 6/2020 | Wood ...................... | B60L 50/40 |
| 11,069,488 B2* | 7/2021 | Johnson ............ | H01M 10/0525 |
| 11,165,266 B2 | 11/2021 | Johnson et al. | |
| 2006/0005739 A1 | 1/2006 | Kumar | |
| 2007/0047100 A1* | 3/2007 | Takahashi ............... | H02J 9/061 |
| | | | 359/689 |
| 2008/0268330 A1 | 10/2008 | Hansen et al. | |
| 2009/0091291 A1 | 4/2009 | Woody et al. | |
| 2009/0133419 A1* | 5/2009 | Matsuno ................. | F25B 27/00 |
| | | | 62/239 |
| 2009/0266091 A1 | 10/2009 | Tolbert, Jr. | |
| 2010/0079109 A1 | 4/2010 | Eilertsen et al. | |
| 2010/0275628 A1 | 11/2010 | Moseley | |
| 2011/0030414 A1 | 2/2011 | Newell et al. | |
| 2011/0218698 A1 | 9/2011 | Bissontz | |
| 2011/0288738 A1 | 11/2011 | Donnelly et al. | |
| 2012/0049638 A1* | 3/2012 | Dorn ........................ | H02J 3/42 |
| | | | 307/87 |
| 2012/0235473 A1* | 9/2012 | Jiang ....................... | H02J 7/345 |
| | | | 307/9.1 |
| 2012/0301750 A1 | 11/2012 | Reis et al. | |
| 2013/0248165 A1* | 9/2013 | Kandasamy ....... | B60H 1/00428 |
| | | | 165/271 |
| 2013/0248615 A1 | 9/2013 | Yeates | |
| 2013/0264875 A1 | 10/2013 | Kaminsky et al. | |
| 2013/0266824 A1 | 10/2013 | Cowperthwaite et al. | |
| 2013/0266826 A1* | 10/2013 | Cowperthwaite ... | H01M 50/296 |
| | | | 29/25.42 |
| 2014/0136055 A1 | 5/2014 | Sugiyama et al. | |
| 2015/0246593 A1* | 9/2015 | Larson ............... | B60H 1/00428 |
| | | | 62/236 |
| 2016/0176298 A1* | 6/2016 | Watson ............... | H01M 50/209 |
| | | | 307/10.6 |
| 2016/0327007 A1 | 11/2016 | Averbukh et al. | |
| 2017/0063104 A1* | 3/2017 | Bean ........................ | H02J 7/007 |
| 2017/0106758 A1* | 4/2017 | Sakatani ................. | B60R 16/03 |
| 2017/0194903 A1 | 7/2017 | Herbert | |
| 2018/0013112 A1 | 1/2018 | Cameron | |
| 2019/0061555 A1 | 2/2019 | Liu et al. | |
| 2019/0067754 A1 | 2/2019 | Gu et al. | |
| 2020/0126735 A1* | 4/2020 | Johnson ................. | H01G 11/86 |
| 2020/0127479 A1* | 4/2020 | Johnson ................... | H02J 7/00 |
| 2021/0012975 A1 | 1/2021 | Su et al. | |
| 2021/0151809 A1 | 5/2021 | Kong et al. | |

OTHER PUBLICATIONS

Translation of CN 205178537 U; Published Apr. 20, 2016; 7 pages.
Translation of CN 106100091 A; Published Nov. 9, 2016; 4 pages.
Screen shot of the Ultimate Guide to ETRU; https://www.safeconnectsystems.com/the-ultimate-user-guide-to-etru/?gclid=CjwKCAjwr56IBhAvEiwA1fuqGjb_gm45-TVIMD0IxRX5OzVFw7PlBEZo05Ggbz8ARqZIbUBLLOFGqhoCHVMQAvD_BwE; 11 pages, Oct. 9, 2021.

* cited by examiner

HYBRID ENERGY POWER MODULE FOR MOBILE ELECTRICAL DEVICES

STATEMENT OF RELATED APPLICATIONS

This application is filed as U.S. Ser. No. 16/352,555. That application was filed on Mar. 13, 2019, and is entitled "Hybrid Energy Storage Device."

The parent application claimed the benefit of U.S. Ser. No. 62/747,902 filed Oct. 19, 2018. That application is entitled "Hybrid Energy Storage Device."

The parent application also claimed the benefit of U.S. Ser. No. 62/753,241 filed Oct. 31, 2018. That application is also entitled "Hybrid Energy Storage Device."

This application further claims the benefit of U.S. Ser. No. 63/209,848. That application was filed on Jun. 11, 2021 and is entitled "Super Capacitor Based Power Module for Refrigerated Trailers."

Each of these applications is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of power generation for mobile electrical units. More specifically, the present invention relates to a modular hybrid super-capacitor and battery used for starting a combustion engine for powering mobile electrical devices such as a cooling system in a trailer.

Discussion of Technology

Refrigeration trucks are used to transport dairy products, produce and other perishable goods across long distances. These trucks broadly comprise a semi-cab and a refrigerated trailer. In the parlance of the industry, this is known as a "reefer truck."

A refrigerated trailer typically works off of a small diesel engine that powers both a compressor and a fan. The compressor is used to circulate refrigerant, or working fluid, through a network of fins and coils, while the fan is provided to circulate air across the coils. Temperature is generally controlled by adjusting the speed at which the fan is blowing, providing cooling in the trailer. Optionally, the fan may be turned off completely.

A refrigeration system comprising the engine, the compressor and the fan may be attached to the front of a class-8 (tractor-trailer) for maintaining controlled temperatures during transport. Often, the refrigeration system receives at least some power from the semi-cab, or tractor, while in motion, or otherwise while the engine is running. Power for the refrigeration system is augmented by the diesel engine that is integral with the refrigeration system on the trailer. This small engine operates when the truck is in-motion, and from an external utility, or "shore power" source, when the truck is stationary. Theoretically, the refrigeration system may also be powered by the truck battery when the truck is stationary but this is highly undesirable.

As technology evolves, distributors and customers are able to monitor the location and temperature of a trailer and critique its contents for spoilage upon arrival. To ensure that the goods are maintained in a chilled state, reefer truck operators will frequently idle their trucks when the semi is not moving down the road to ensure that the refrigeration system continues to operate. However, environmental regulations may apply that prevent the operator from idling the truck and/or small diesel engine when the truck is not moving, thereby limiting operation of the refrigeration system or requiring multiple start/stop cycles.

With the advent of computers on trucks, electrical systems are monitored more closely, including the off-system voltage. In some cases, the operator may start the truck multiple times just to charge the battery or to keep it in a healthy charge state. Batteries are often replaced to mitigate the risk of a non-start.

Therefore, a need exists for an improved power source for starting a combustion engine associated with a refrigeration system on a trailer. A need further exists for a power source for a trailer that takes advantage of both a battery and super capacitors in an integrated module, or housing, for starting an engine that provides power to mobile electrical devices. Such devices may include heaters, blowers, lights, air conditioning, or other electrical devices.

SUMMARY OF THE INVENTION

A power generation system for a mobile electrical device is provided herein. The mobile electrical device resides on a trailer. The trailer is preferably an over-the-road trailer configured to be pulled by a semi-cab. The semi-cab may be a class-07 or class-08 working truck. Alternatively, the trailer may be a rail car pulled by a locomotive engine, or an intermodal container carried by a ship.

In one aspect, the power generation system first comprises a combustion engine. The combustion engine serves as a power generator for the mobile electrical device. The combustion engine may be, for example, a small diesel engine. The combustion engine is located on the trailer.

The power generation system also includes a power module. The power module comprises an ultra-capacitor and a battery. The battery may be, for example, a Lithium-Ion battery or a Nickel-Metal Hydride battery. The ultra-capacitor and the battery reside together within a housing having a first device terminal and a second device terminal. In addition, the ultra-capacitor and the battery reside together within the housing, in parallel.

The power module is configured to be electrically supported by the alternator of a vehicle. Preferably, the trailer is an over-the-road trailer configured to be pulled by a truck. The truck has an electrical system comprising a vehicle battery and the alternator. The ultra-capacitor is in electrical communication with the alternator, such as by means of electrical cables that extend from the truck.

The power module is in electrical communication with the combustion engine to provide starting power. The power module may optionally comprise a current control. The current control is configured to limit current that enters the ultra-capacitor.

Preferably, the mobile electrical device is a refrigeration system on the trailer. The refrigeration system first includes a cooling unit. The cooling unit uses a working fluid that resides within a closed fluid circuit. The working fluid is known as a refrigerant. The fluid circuit will include an evaporator having a network of fins and coils. Liquid refrigerant is circulated through the coils of the evaporator and absorbs heat.

The refrigeration system further comprises an air handling unit. The air handling unit includes a fan that rotates about a shaft. The fan is configured to draw air, and then move the air across the fins and tubes, or coils, of the evaporator. The fins provide surface area for cooling outside air as it is pushed through the evaporator by the fan. The air is cooled as it is pushed through the evaporator.

The refrigeration system also includes a compressor. The compressor receives low pressure gaseous refrigerant as it leaves the evaporator, and compresses it. The compressor pressurizes the refrigerant, producing a high pressure gas. Some parts of the reefer industry may refer to the compressor as a condenser motor.

It is noted here that a refrigeration system may also serve as a heating system. All that is required is for the condenser motor to circulate the refrigerant in the opposite direction. In this instance, the heat generated by the warmed refrigerant passing through the compressor is circulated directly into the evaporator. Thus, the term "refrigeration system" could be referred to as a climate control system. In either instance, the combustion engine provides power for driving the fan motor and the condenser motor in the refrigeration/climate control system.

As part of the refrigeration system, a power module is provided. The power module provides electrical starting power for the combustion engine. At the same time, the combustion engine is configured to supply energy to both the cooling unit and the air handling unit to cool the trailer, replacing any battery associated with the engine and replacing direct reliance on the truck alternator to start the engine. In the present disclosure, the power module comprises both an ultra-capacitor and a battery. Preferably, the ultra-capacitor comprises a series, or bank, of super capacitors. Likewise, the battery comprises a series of lithium-based batteries. Each individual battery may be a lithium-ion battery (or "LIB").

In the power module, each individual super capacitor is in parallel with a corresponding battery, forming pairs of super capacitors and batteries. Preferably, 6 to 12 pairs of super capacitors and batteries are provided, in series.

The ultra-capacitors and the batteries reside together within a housing. The housing has first and second terminals, thereby forming the power module. The power module is configured to supply energy to both the cooling unit (that is, the condenser motor) and the air handling unit (that is, the fan) to cool the trailer. In a preferred aspect, the power module's primary function is to start the diesel engine associated with the refrigeration system in the trailer, which in turn provides the energy to drive the fan motor and the condenser motor.

Where the trailer is an over-the-road trailer, the power module may draw energy from an alternator of the truck. In this instance, the ultra-capacitor is in electrical communication with the alternator by means of electrical cables that extend from the truck. The power module may then further comprise a current control configured to limit current that enters the ultra-capacitor.

In one aspect, the bank of ultra-capacitors is configured to put out at least 36,000 joules of starting energy for the refrigeration system. Each of the batteries in the bank of lithium-based batteries may have a voltage rating of 2.4 volts, while each of the super capacitors in the bank of ultra-capacitors has a capacitance value of at least 2,000 Farads, and more preferably at least 3,000 Farads.

In one embodiment, the power module further comprises an integrated DC/DC boost converter. The DC/DC converter includes an input side and an output side. The input side is connected to electrical cables that extend from the alternator, while the output side is connected to the bank of super capacitors. Thus, the super capacitors are in electrical communication with and are charged by the alternator of the truck.

In one embodiment, the power module represents combined capacitors and batteries in modular form. The capacitors and the batteries are individually selected based on application needs, and then mechanically combined into a single electrical energy storage device. A series of sub-modules are connected in series to provide the desired energy.

The power module comprises a first sub-module, which represents a capacitor. The power module also includes a second sub-module, which represents a battery. The first sub-module (or capacitor module) and the second sub-module (or battery module) are designed to be mechanically connected to form a single energy storage device. This may be done by mechanically mating the first sub-module with the second sub-module using male and female connector portions.

The capacitor module and the battery module are further designed to be placed in electrical communication. The electrical connector of the capacitor module electrically mates with an electrical connector of the battery module. Thus, when the sub-modules are mechanically connected, the electrical connector of the capacitor module is placed in electrical communication with the electrical connector of the battery module.

The power module may also include a threaded connector. The threaded connector is used to secure the two modules by connecting the male and female mechanical connector portions.

In one embodiment, a male connector portion extends from a top and side surface of the capacitor module, while a female connector portion resides along a top and side of the battery module. The female portion is dimensioned to closely receive the male portion. Each of the female and male portions has a through-opening configured to align and to receive the threaded connector when the male portion receives the female portion.

In an alternate embodiment, the male connector portion extends from a top and side surface of the battery module, and the female connector portion resides along a top and side of the capacitor module. The female portion is again dimensioned to closely receive the male portion. Each of the female and male portions has a through-opening configured to align and to receive the threaded connector when the male portion receives the female portion.

A method of forming a charge storage device is also provided. In one aspect, the method first comprises selecting a size for a capacitor. In this instance, "size" refers to capacitance, or storage potential. This is typically measured in Farads. The method then includes providing a capacitor having the selected size.

The method also comprises selecting a size for a battery. In this instance, "size" refers to electrical energy. Size may be measured in voltage and/or amps. More preferably, size refers to kilo-watt hours for a battery. The method then further includes providing a battery having the selected size.

In the method, the capacitor resides within a first sub-module. The first sub-module has a mechanical connector portion and an electrical connector. At the same time, the battery resides within a second sub-module. The second sub-module also has a mechanical connector portion and an electrical connector.

The method additionally includes mechanically connecting the first sub-module and the second sub-module. The first sub-module and the second sub-module are designed to be mechanically connected to form the single energy storage device. This may be done in one embodiment by mechanically mating the first sub-module with the second sub-module using the mechanical connector of the capacitor as a male portion, and the mechanical connector of the batter as a female portion.

At the same time, the electrical connector of the capacitor module mates with the electrical connector of the battery module, providing both a mechanical and electrical connection through male-female connections. When the sub-modules are connected, the capacitor is placed in electrical communication with the battery forming a hybrid electrical energy storage device. A plurality of such hybrid electrical energy storage devices may be placed in series and/or in parallel combinations to form the power module of a reefer.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
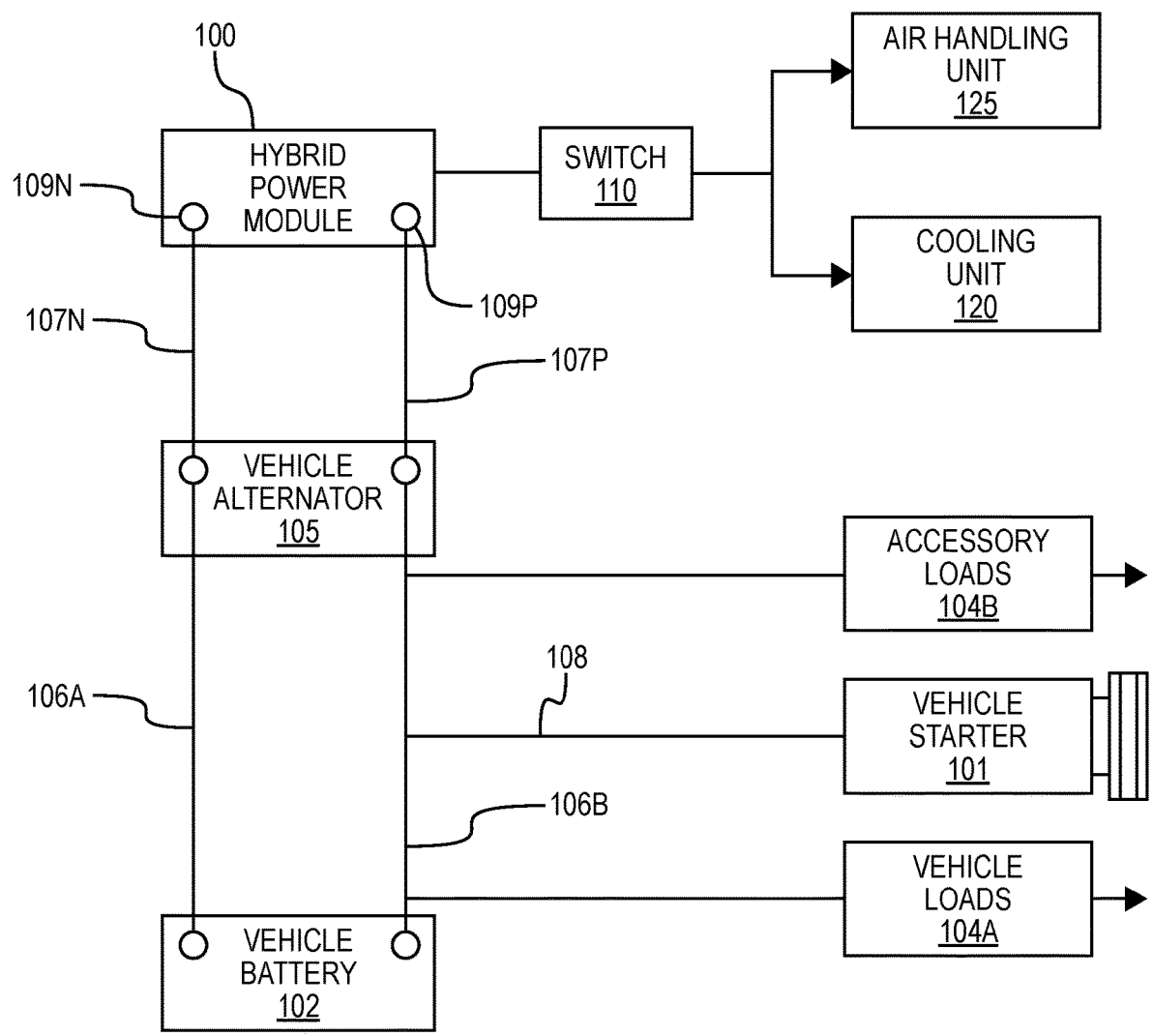
FIG. 1 is a diagram illustrating an electrical system for a truck having a refrigerated trailer, in one example. A vehicle alternator is in electrical communication with a hybrid power module, shown schematically.

FIG. 1 is a diagram illustrating an electrical system for a truck having a refrigerated trailer, in one example. The electrical system includes a vehicle battery 102 and a vehicle alternator 105. The battery 102 is in electrical communication with the alternator 105 by means of wires 106. These may be a negative DC bus 106a and a positive DC bus 106b.

Figure 2:
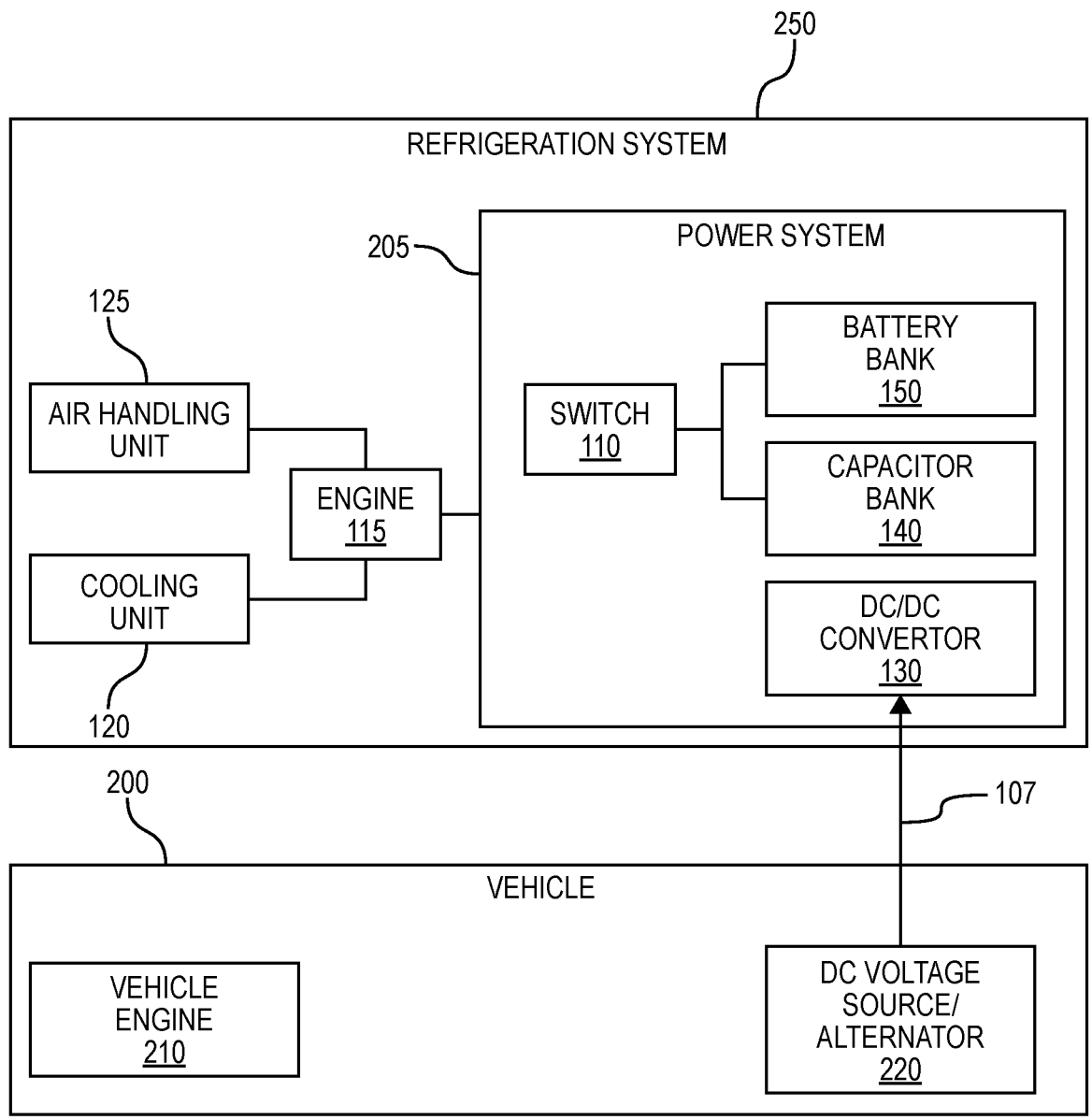
FIG. 2 is a diagram illustrating a vehicle having a trailer. The trailer includes a refrigeration system for cooling the trailer and its contents.

The vehicle battery 102 sends a charge to a vehicle starter 101 in order to crank an engine (shown at 210 in FIG. 2). Line 108 is illustrative of a DC bus used to convey charge. Thereafter, energy from the battery 102 and the alternator 105 support vehicle loads 104a and accessory loads 104b. Vehicle loads 104a generally refers to the hotel load internal to the vehicle, while accessory loads 104b generally refers to external loads that may be carried by the vehicle, such as lighting for the trailer or aftermarket parts. Accessory loads 104b also refers to electrical support for a diesel engine in the reefer trailer. The present system and methods seeks to reduce this aspect of the accessory loads 104b.

In the illustrative arrangement of FIG. 1, the alternator 105 is in electrical communication with a hybrid power module 100. This is done using positive 107P and negative 107N cables. The cables 107 may be lengthy, extending from a front of the truck to the trailer in the rear.

The trailer is outfitted with a refrigeration system (illustrated at 250 in FIG. 2). The refrigeration system includes a switch 110, used by the operator to manually or remotely turn on and turn off the refrigeration system. The switch 110 may include a thermostat with a temperature sensor.

The refrigeration system also includes a cooling unit 120. The cooling unit 120 comprises a working fluid, or refrigerant, that resides within a fluid circuit. The fluid circuit will include an evaporator having a network of fins and coils (not shown). Liquid refrigerant is circulated through the coils and absorbs heat.

The cooling unit 120 also includes a compressor. The compressor is configured to move the working fluid through the coils of the cooling unit 120 under pressure. For purposes of the illustration of FIG. 1, the compressor resides within the box designated for the cooling unit 120. In some parts of the industry, the compressor is referred to as a condenser motor.

The refrigeration system further comprises an air handling unit 125. The air handling unit 125 has a fan driven by a shaft (not shown). The fan is configured to move air across the coils of the cooling unit 120.

In some cases, a refrigeration system may comprise a separate condenser. The condenser receives warm gaseous refrigerant after it has been pumped by the compressor, and cools the refrigerant using outside air. As the name implies, the refrigerant is condensed into a liquid.

The evaporator receives the cooled liquid from the condenser. As the refrigerant enters the evaporator, it passes through a metering valve (also part of the cooling unit designated at 120) that controls the amount of refrigerant released into the evaporator. The metering valve is typically referred to as an expansion valve. The expansion valve acts like a throttle to control the amount of cooling while also maintaining back pressure in the high-pressure part of the system, which runs from the compressor to the expansion valve.

As the refrigerant passes through the expansion valve, pressure is reduced and the refrigerant rapidly expands, once again becoming a gas. The gas travels through the coils of the evaporator and absorbs heat from the finned coils. Air from inside the trailer is blown over the evaporator by the air handling unit 125. The refrigerant gas, now under low pressure, is drawn back to the compressor where the cycle starts again.

The refrigeration system 250 is powered by the hybrid power module 100. The power module 100 comprises both an ultra-capacitor and a battery. Preferably, the ultra-capacitor comprises a series, or bank, of super capacitors. Likewise, the battery comprises a series of batteries. Each individual battery may be a lithium-ion battery (or "LIB"), such as a battery having Lithium-Tritonate. Alternatively, each battery may be a Nickel-Metal Hydride (or "NiMh") battery or even a Lead Acid battery.

The ultra-capacitor and the battery reside together within a housing. The housing has first 109N and second 109P terminals, thereby forming the power module 100. The power module 100 is configured to supply energy to both the cooling unit 120 and the air handling unit 125 to cool the trailer, or "reefer." In one aspect, the power module's primary function is to start a diesel engine 115, which in turn drives the shaft of the air handling unit 125 and drives the condenser motor within the cooling unit 120.

The hybrid power module 100 sends power to the refrigeration system 250 through the switch 110. The switch 110 may include a panel of options including timers, temperature settings, fan speeds and voltage sensors. Components of the switch 110 may be solid state. As understood in the art of electronic, solid-state components, including field-effect transistors (FETs) and insulated gate bipolar transistors (IGBT), solid state components tend to be faster, more reliable, and consume less power than relays and contactors.

The switch 110 may send control signals to the fan of the air handling unit 125, controlling a speed of the fan or turning the fan off. Optionally, the switch 110 may also send control signals to louvers (not shown) associated with the evaporator. When the louvers are closed, or substantially closed, a flow of air from the air handling unit 125 is reduced. Reciprocally, when the louvers are opened, or substantially opened, a flow of air from the air handling unit 125 is increased.

Where the trailer is an over-the-road trailer, the power module 100 will draw energy from the alternator 105 of a truck. In this instance, the ultra-capacitor is in electrical communication with the alternator 105 by means of electrical cables 107 that extend from the truck 200. In this instance, the power module 100 may further comprise a current control configured to limit current that enters the ultra-capacitor.

FIG. 2 is a diagram illustrating a vehicle 200. The vehicle 200 is configured to pull a trailer having a refrigeration system 250. The vehicle 200 includes an engine 210 and a DC voltage source 220. The DC voltage source is likely an alternator 105. In this arrangement, power from the alternator 220 is "thiefed" in order to provide power to the refrigeration system 250 through cables 107.

The refrigeration system 250 again includes a cooling unit 120 and an air handling unit 125. The cooling unit 120 and the air handling unit 125 are powered by a power system 205. The power system 205 will include the switch 110 from FIG. 1.

The power system 205 will also include a bank of super capacitors 140. The super capacitors 140 are charged by the DC voltage source of the vehicle 200. Similarly, the power system 205 includes a bank of LIB batteries 150. The alternator 220 may also support the bank of batteries 150.

In one aspect, the bank of super capacitors 140 is configured to put out at least 36,000 joules of starting energy. At the same time, each of the batteries in the bank of lithium batteries 150 has a voltage rating of 2.4 volts. In still another aspect, super capacitors in the bank of ultra-capacitors 140 have a capacitance value of at least 2,000 Farads, and more preferably at least 3,000 Farads.

Within the power system 205, each individual super capacitor is in parallel with a corresponding battery, forming pairs of super capacitors and batteries. Preferably, 6 to 12 pairs of super capacitors and batteries are provided, in series. Each battery in the bank of batteries 150 serves as a voltage clamp for its corresponding capacitor 140.

In one embodiment, a Zener diode is placed across each super capacitor, forming an active voltage clamp type balance circuit. The Zener diode clamp limits the maximum voltage that each super capacitor sees during charging. This keeps the super capacitor cells balanced, healthy and equally sharing the load by minimizing any chance of overcharging. Preferably, each super capacitor provides 2.5 volts DC charge.

Figure 3:
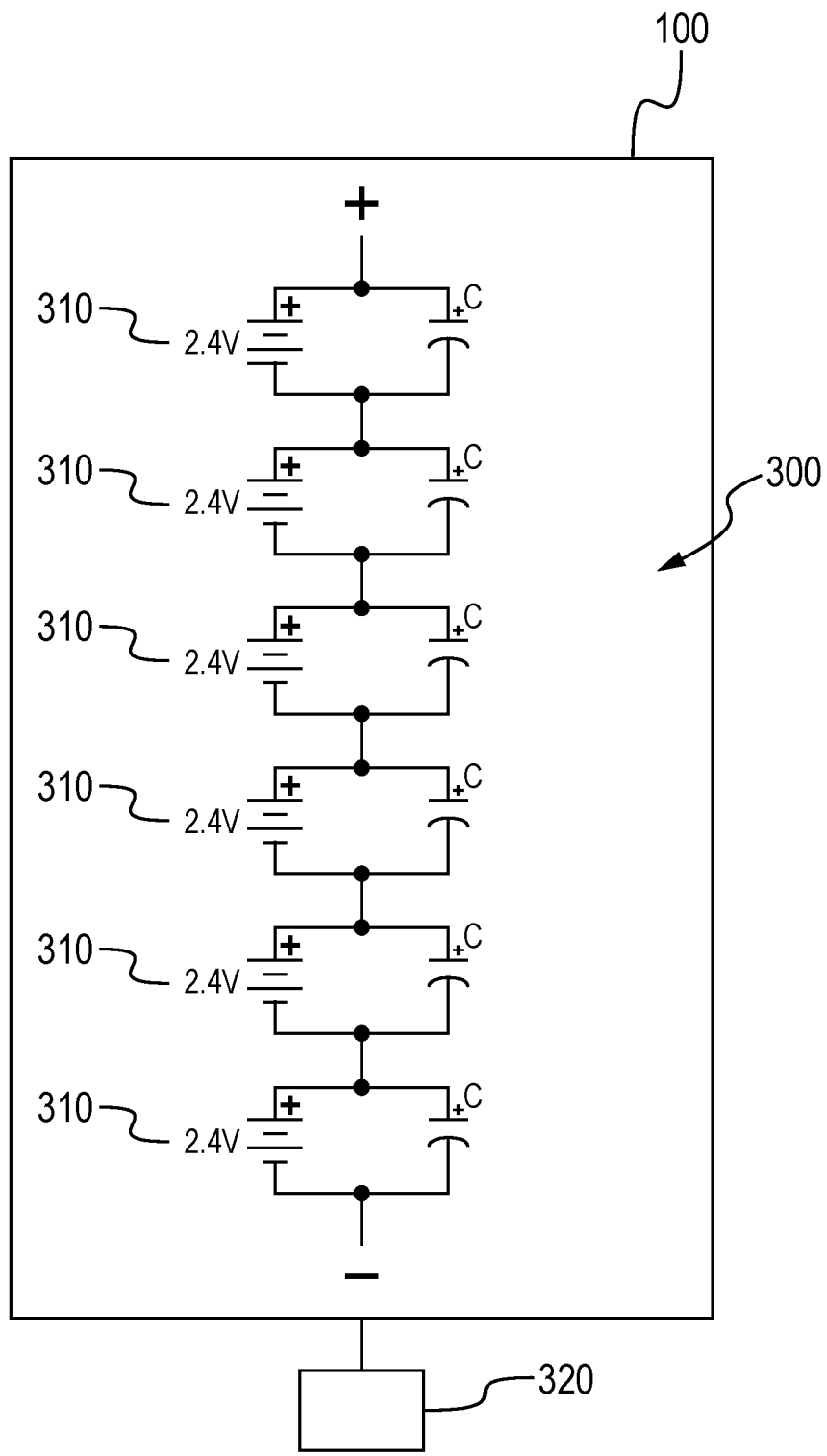
FIG. 3 is a diagram of the architecture of the hybrid power module of FIG. 1, in one embodiment.

FIG. 3 is a diagram of the architecture 300 of the hybrid power module 100 of FIG. 1, in one embodiment. The module 100 may be used as the combined capacitor bank 140 and battery bank 150 of the power system 205. The module 100 presents a series of sub-modules 310, wherein each sub-module 310 contains a 2.4V battery and a nominally 2.5V to 2.7 V super-capacitor C. Six sub-modules 310 are shown, though again up to 12 pairs of super capacitors and batteries may be provided, in series and/or parallel combinations, for built-in redundancy.

Because each super capacitor C will have its own equivalent series resistance (ESR), the super capacitor cells will not all absorb charge equally. Placing the batteries in parallel with respective super capacitors C will accomplish UC balancing.

In one aspect, the architecture 300 includes a current controller 320. The controller 320 limits or controls DC current coming in from the alternator 220. The controller 320, or current limiter, may comprise at least one of a positive-temperature-coefficient resistor and a resistive bridge.

The power module 100 works with a DC/DC converter. A DC/DC converter is shown in FIG. 2, at 130. The converter 130 is preferably an integrated DC/DC boost converter. The DC/DC converter includes an input side and an output side. The input side is connected to the electrical cables 107 that extend from the alternator 220, via the controller 320, while the output side is connected to the power module 100. In one aspect, the DC/DC converter 130 is configured to boost voltage from 8 volts DC to 18 volts DC.

Returning to FIG. 2, the capacitors "C" in the capacitor bank 140 are in electrical communication with and are charged by the alternator 220 of the truck 200. The capacitors in the capacitor bank 140 are configured to store charge received from the electrical system of the vehicle. In one embodiment, a rectifier (not shown) is provided for the power system 205. The rectifier is configured to provide unidirectional current flow from the alternator 220 to the super capacitors in the bank 140. At the same time, the parallel circuitry between the super capacitors 140 and the batteries 150 allows a bi-directional flow between the super capacitors 140 and the batteries 150. This provides a system wherein the bank of capacitors 140 is configured to mitigate some of the spikes and drops in power typical during operation of the cooling unit 120 and the air handling unit 125.

It is noted that the refrigeration system 250 and the power system 205 are generally located in a trailer behind a truck 200. This means that the bank of capacitors 140 and the bank of batteries 150 reside remote from the electrical system of the vehicle 200. Thus, alternator cables 107 extend from the alternator 220 to the power system 205 in the back.

In one aspect, current supplied to the cooling unit 120 and the air handling unit 125 from the hybrid power module 100 will be generated proportionally from both the super capacitors 140 and the batteries 150. Additionally, because current can flow between the capacitors 140 and the batteries 150, the available charge and voltage of the super capacitors 140 will also generally move towards a charge and voltage equilibrium relative to that of the batteries 150 when the alternator 220 is in an off state. Such voltage equilibrium may generally be less than the state of charge and voltage of the capacitors 140 if it were to be electrically isolated from the batteries 150.

In one aspect, the bulk of the power generation for the refrigeration system will come from the super capacitors 140. This is due to their innate low equivalent series resistance (ESR). While the parallel battery supports the long term ability to hold the charge voltage on the capacitors 140, even after repetitive attempts and long durations before recharge, it also assists in supporting starting current. Both the ultra-capacitor pack 140 and the battery pack 150 are specifically and individually designed for long cycle life.

Figure 4:
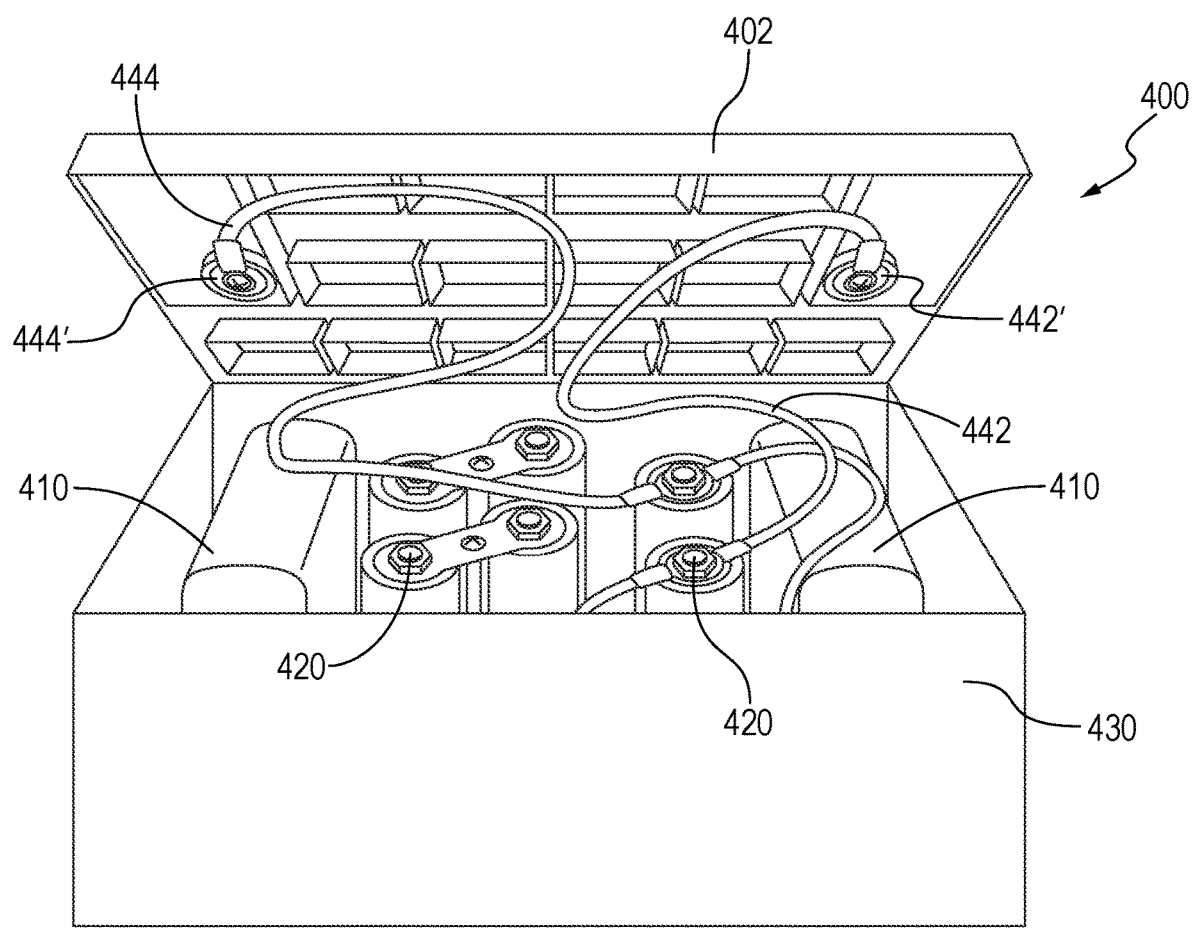
FIG. 4 is a perspective view of a hybrid power module of FIG. 1, in an alternate embodiment.

FIG. 4 is a perspective view of a hybrid power module 400, in an alternate embodiment. In this arrangement, power module 400 provides charge storage devices in the form of two LIB batteries 410 and three pairs of super capacitors 420. The batteries 410 and super capacitors 420 reside together within a housing 430, with the housing having a lid, or cover 402, protecting the charge storage devices 410, 420. It is understood that additional batteries 410 and additional super capacitors 420 may be employed within the housing 430 to increase energy availability.

The batteries 410 and super capacitors 420 are connected in parallel. Wires 442 and 444 lead to terminals 442', 444' secured in the cover 402. Terminal 442' is a positive terminal while terminal 444' is a negative terminal.

The integrated lithium battery and ultra-capacitor modules 100, 400 described herein offer reliable starts for the air handling unit 125 and the cooling unit 120. Combining individual super capacitors with individual batteries insures that a combustion engine, such as a diesel engine on a refrigerated trailer, will turn over when started. The combination merges the high current capabilities of super capacitors with the long term energy of batteries. The integrated lithium battery and ultra-capacitor module 100 may provide over 10,000 starts, and provides an excellent device for both intermittent and high cycle starting.

There are multiple advantages to the hybrid power modules 100, 400 described herein. These include elimination of the voltage drop inherent with long truck cabling from the main system battery to the trailer. The power modules 100, 400 offer a wide operating temperature range of −40 to +65° C. The power modules 100, 400 are RoHs compliant. They have ultra-low self-leakage and will enable the open circuit voltage to be above 13.5 volts DC even after months of non-use.

The power modules 100, 400 may be quickly charged during short intervals over a nearly indefinite time frame. The power modules 100, 400 are capable of long life while experiencing both deep and short cycles. Preferably, the module 100 is fully integrated and sealed, and uses standard terminals connections. In other words, a module would fit where a battery would fit. The module 100 is self-balancing for long life. Specifically, the parallel combinations help provide the cell-to-cell balancing that is desired for long life, insuring that no single ultra-capacitor cell is subjected to an overcharge voltage.

Additional features may be included with the power system 205. For example, the power system 205 may comprise a sensor. The sensor senses the internal resistance of the batteries 150. This enables a user to determine the condition of the batteries 150. Those of ordinary skill in the art will understand that when a battery sits idle, chemical reactions can take place in the cells, thereby increasing the internal resistance of the battery, reducing its ability to generate the charge needed to crank an engine.

The power system 205 may further include a micro-controller. The micro-controller receives signals from the sensor that are indicative of internal resistance. Using a transceiver, the micro-controller then sends the signals to a computer (which may be a network server or may be an application running on a portable communications device, or both). Signals are sent using a wireless communications system.

The signals are processed by the computer such that a remote operator is able to review the signals and determine the status of the bank of batteries 150 in real time. In addition, the micro-controller may have a GPS module. In this instance, the micro-controller sends signals indicative of GPS coordinates. In this way, the operator may determine a location of the power system 205 at any given moment.

Beneficially, the power system 205 uses a non-isolated DC/DC converter 130 with input current limits that are compatible with existing alternator charging characteristics. The bank of super capacitors 140 is connected to the output of the DC/DC converter 130 and will charge up to approximately 14.5 volts DC in approximately 5 minutes from a typical halfway charge level. This enables the recharge time to be reduced to 5 to 10 minutes, providing an ideal scenario for the truck engaged in numerous delivery stops.

The power module 100 is extremely cost-effective when considering the recommended battery replacement intervals and the cost of the spoilage of loads.

In connection with the power system 205, it is also noted that batteries and capacitors are both used for storing electrical charge. However, they operate in different ways.

Batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge.

Some batteries are rechargeable. A well-known example is the lithium-ion power pack used for laptop computers and small, portable electronic devices. In these batteries, the electricity-inducing reactions run between the terminals in either direction. The result is that the battery can be charged and discharged hundreds of times before replacing. However, charging a battery is slow. For example, batteries used for electric motorcycles typically take 4 to 7 hours to re-charge. Charging most hybrid vehicles when plugged into a standard 110 volt receptacle today requires at least 5 hours to provide a mere 20 miles of driving life.

Batteries are frequently used in cars, trucks, boats, jet skis and other mobile units as a way of providing the initial starting charge for an internal combustion engine. For electrical cars and motorcycles, batteries provide ongoing power to turn a shaft and to power electrical devices (such as a radio or sensors). Beneficially, electric motors have a much broader torque curve than internal combustion engines, and produce 100% of their torque at 0 RPM's. Electric motorcycles can operate without a transmission and electric automobiles can operate with only a single speed gear box.

Batteries can also be used to provide power for portable refrigeration systems such as those found in rail cars and over-the-road trailers. The larger the charge that is needed, the larger the battery (measured in kilo-watts) and the longer the time it takes to re-charge.

Capacitors, on the other hand, can be charged almost instantly. Capacitors weigh less than batteries and typically do not contain chemicals or toxic metals. The downside though is that capacitors can store only small amounts of energy.

Capacitors use static electricity (or electrostatics) rather than chemistry to store energy. A capacitor utilizes two opposing conducting metal plates with an insulating material there between. The insulating material is referred to as a dielectric, which prevents the plates from coming into contact. Increasing the dielectric thickness and plate area allows a capacitor of a certain size to store more charge at the same voltage.

Some capacitators are referred to as super-capacitors. A super-capacitor (or ultra-capacitor) differs from an ordinary capacitor in that its plates effectively have a much bigger surface area and the distance between them is much smaller. In the case of a super-capacitor, the plates are made from a metal coated with a porous substance such as powdery, activated charcoal. The porosity provides the greater surface area for storing more charge, providing more Farads. Also of interest, in a super-capacitor there is no dielectric material per se; instead, both plates are soaked in an electrolyte and separated by a very thin insulator.

When the plates are charged, an opposite charge forms within the electrolyte at the interface along the porous surface, creating what is called an electric double-layer. The double-layer is extremely thin, perhaps only one molecule thick (compared to a dielectric that might range in thickness from a few microns to a millimeter or more in a conventional capacitor). For this reason, super-capacitors are sometimes referred to as double-layer capacitors, or electric double-layer capacitors ("EDLC's").

The capacitance of a capacitor increases as the area of the opposing plates increases and also as the distance between the plates decreases. Capacitors have many advantages over batteries. As noted above, they generally weigh less. They can also be charged and discharged hundreds of thousands of times without wearing out. However, by design they are unable to store a charge as do batteries.

Super-capacitors are ideal for providing an initial charge for an internal combustion engine. For example, a super-capacitor may be used to provide a charge for the starter on an ICE motorcycle. A small battery may be separately provided to power up the capacitor for its one-time charge. The bank of super capacitors 140 may be used to start a small diesel engine associated with a reefer trailer, or to start a condenser motor.

The expanding market of portable electronic devices and, especially, the emergence of electric vehicles and hybrid electric vehicles, has created increasing demand for energy devices. Different applications will require different combinations of capacitor and battery. Currently, companies offer numerous combined capacitor and battery units to meet these different applications. However, the battery and the capacitor are sold to the customer and installed as singular units, requiring the supplier or distributor to carry numerous units meeting different energy requirements.

Figure 5:
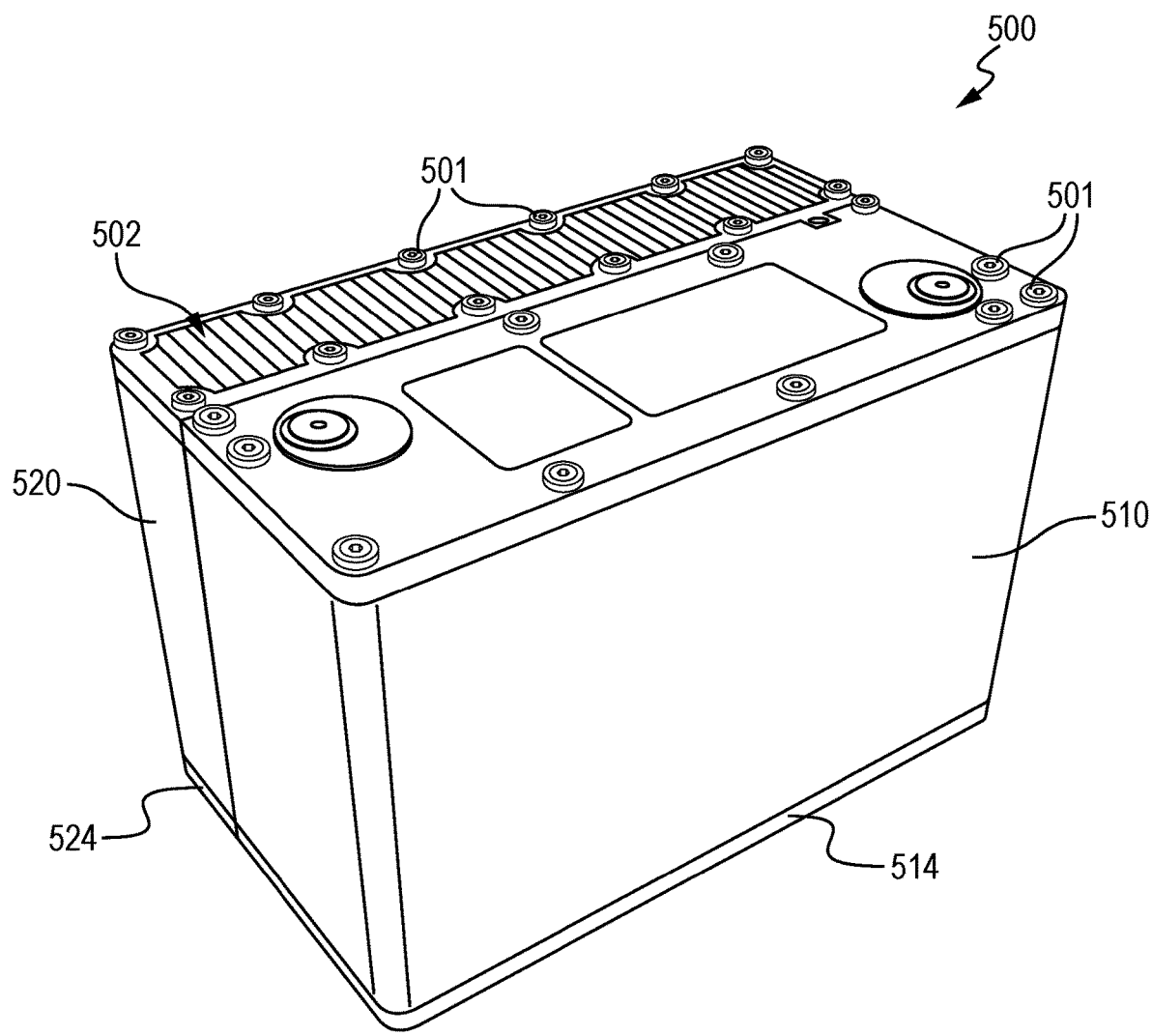
FIG. 5 is a perspective view of a hybrid energy storage device of the present invention, in one embodiment. The energy storage device represents a combined capacitor module and battery module, wherein each of the capacitor module and the battery module reside in their own separate housing, or sub-module.

FIG. 5 is a perspective view of a hybrid energy storage device 500 of the present invention, in one embodiment. The energy storage device 500 represents a combined battery 510 and capacitor 520, wherein each of the battery 510 and capacitor 520 reside in their own separate sub-module.

In the view of FIG. 5, the battery 510 and the capacitor 520 have been connected, forming a single energy storage device 500. A plurality of bolts 501 are shown securing a cover 502 to the device 500. In actuality, the cover 502 is a pair of separate covers (presented as 512 and 522 in FIGS. 6 and 7) residing together over respective sub-modules 510, 520.

Figure 6:
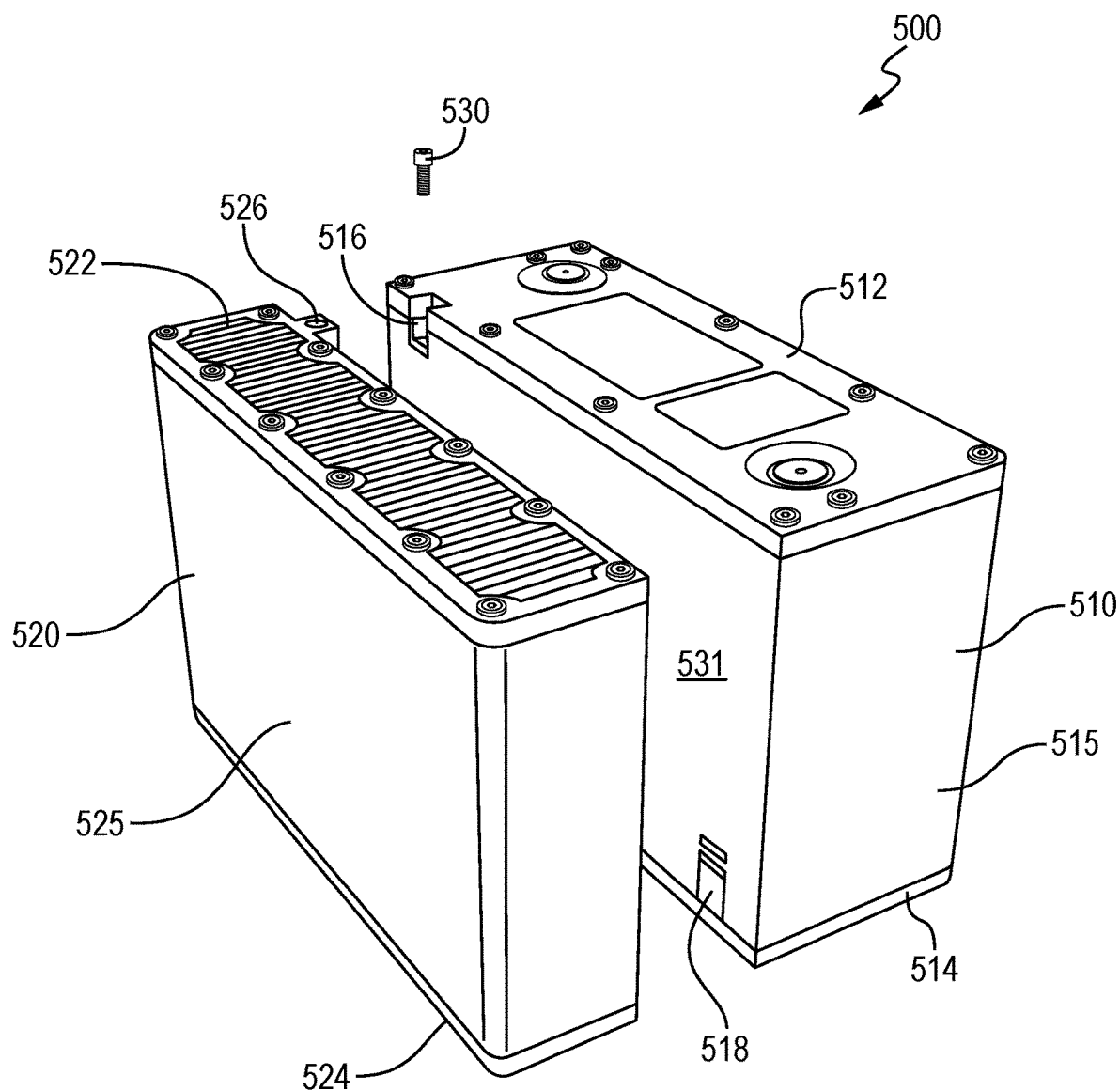
FIG. 6 is an exploded perspective view of the hybrid energy storage device of FIG. 5. Here, the capacitor module is separated from the battery module. Similarly, a threaded connector is exploded away from male and female mating portions.
Figure 7:
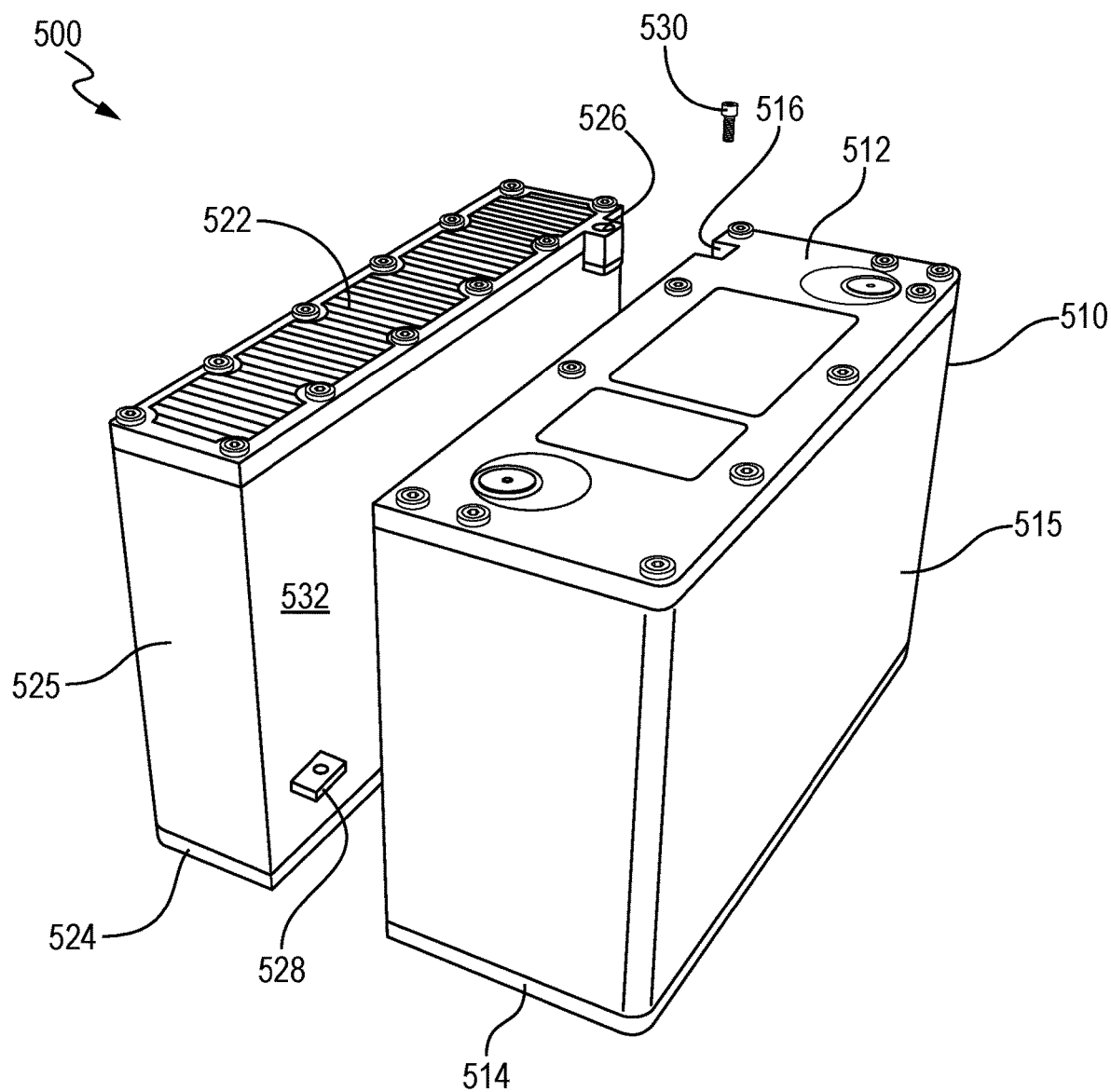
FIG. 7 is another exploded perspective view of the hybrid energy storage device of FIG. 5, shown from a different angle. The capacitor module and the battery module are again separated.

FIG. 6 is an exploded perspective view of the hybrid energy storage device 500 of FIG. 5. Here, the capacitor 520 is separated from the battery 510. FIG. 7 is another exploded perspective view of the hybrid energy storage device 500 of FIG. 5. In this figure the separated capacitor 520 and battery 510 are shown from a different angle.

As can be seen from FIGS. 5 through 7, the battery 510 comprises a body 515 having a polygonal profile. The body 515 has a top cover 512 and a base 514. The body 515 comprises a female connector portion 516 on one side 531. In this arrangement, the connector portion 516 defines a recessed portion of the body 515. The body 515 further includes a female electrical connector 518 on the same side 531.

The capacitor 520 also comprises a body 525 having a polygonal profile. The body 525 too has a top cover 522 and a base 524. The body 525 comprises a male connector portion 526 on one side 532. The body 525 further includes a male electrical connector 528 on the same side 532.

As demonstrated in FIG. 5, the battery 510 and the capacitor 520 are configured to be joined together to form a single energy storage device 500. Joining the modules 510, 520 involves placing the side 531 of the battery 510 adjacent the side 532 of the capacitor 520. The two bodies 515, 525 are pushed together so that the male connector portion 526 of the capacitor 520 is received by the female connector portion 516 of the battery 510. At the same time, the male electrical connector 528 of the capacitor 520 is received by the female electrical connector 518 of the battery 510.

To maintain the two bodies 515, 525 as a singular device 500, one or more threaded connectors may be used. In the arrangement of FIGS. 6 and 7, a threaded connector 530 is exploded away from male 526 and female 516 mating portions for illustrative purposes. The male 526 and female 516 mating portions are configured to receive the threaded connector 530 together.

Figure 8A:
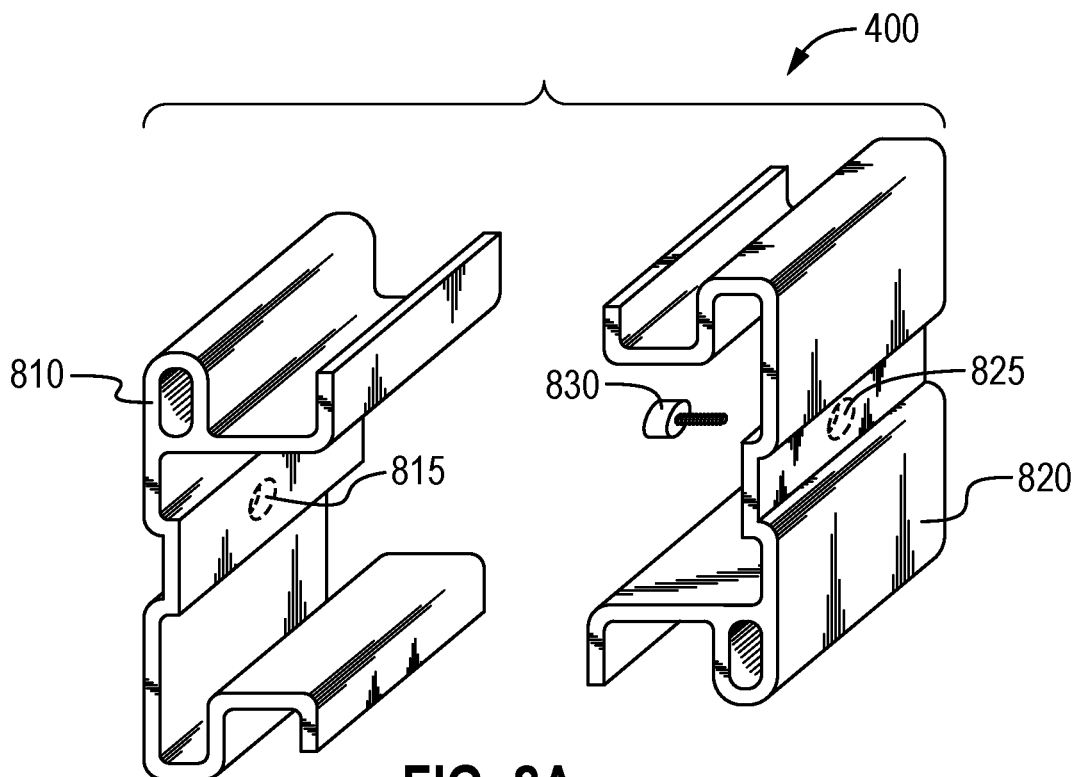
FIG. 8A is a perspective view of an optional connector system for connecting the capacitor module and the battery module of FIGS. 6 and 7. Here, clips of the connector system are exploded apart for illustrative purposes.

In an alternate, optional arrangement, the battery 510 and the capacitor 520 may be mechanically connected using mating clips. FIG. 8A is a perspective view of an optional connector system 800 for connecting the battery 510 and the capacitor 520 of FIGS. 6 and 7. The connector system 800 employs a first clip 810 and a second clip 820. In this illustrative arrangement, each clip 810, 820 is a mirror image of the other.

The clip 810 is designed to be connected to a side (such as side 531) of the battery 510. This connection may be made through an integral plastic injection molding of the body 515, or it may be secured using a threaded connector 830.

Similarly, the clip 820 is designed to be connected to a side (such as side 532) of the capacitor 520. This connection too may be made through an integral plastic injection molding of the body 525, or it may be secured using a threaded connector such as connector 830.

Figure 8B:
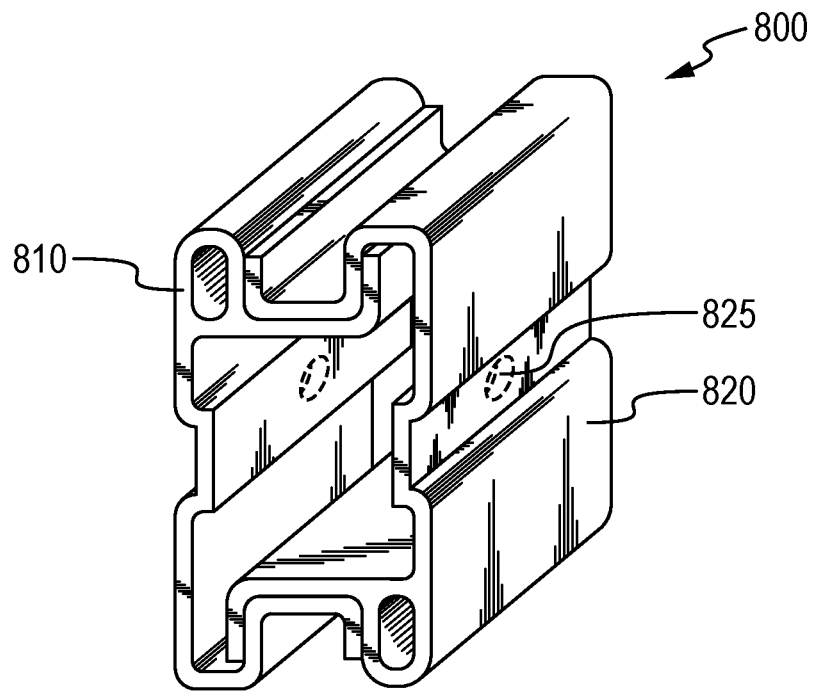
FIG. 8B is another perspective view of the connector system of FIG. 8A. Here, the clips have been mechanically connected.

In the view of FIG. 8A, the clips 810, 820 are in exploded apart relation for illustrative purposes. FIG. 8B is another perspective view of the mechanical connector system 800 of FIG. 8A. Here, the clips 810, 820 have been mechanically connected. This has been done by interlocking the clips 810, 820 together. Of interest, the clips 810, 820 are self-interlocking through the use of gravity and the mirrored configuration.

It is observed that the connector system 800 is merely illustrative. Other clip or other connector arrangements may be used. If clips are used, then the electrical connectors 518, 528 may need to be reconfigured such as by extending their lengths.

For purposes of the energy storage device 500, it is preferred that the device 500 offer high energy, high power densities and long cycling life. The battery 510 is preferably a lithium-ion battery (or "LIB") while the capacitor 520 is preferably a supercapacitor (or "SC").

It is understood that LIB's can deliver high energy densities (150-250 Watt-hours/kg) by utilizing Faradaic reactions throughout the active materials comprising the batteries. However, this mechanism may lead to low power densities (<1,000 Watts/kg) since solid-state ion diffusion in bulk electrolyte is generally slow. LIB's may also suffer from short cycling lives (<1,000 cycles) due to degradation of material structures.

On the opposite extreme, SC's typically offer high power densities (about 1,000 to 10,000 Watts/kg) because of the fast physical sorption rates of charges on the surfaces of active materials comprising the capacitors. This mechanism may also enable long cycling lives (>500,000 cycles) because it generally does not cause major structural changes. However, as only the surface is typically utilized, the energy densities of SC's are very limited (e.g., 5-10 Wh/kg).

Hybrid supercapacitors (or supercapacitor-battery hybrid energy storage systems) have been proposed as a way to incorporate the advantages of both LIB's and SC's into one system. Existing supercapacitor systems consist of SC electrodes (activated carbon) as cathodes to ensure high power density through adsorption/desorption of anions, and LIB electrodes as anodes to provide high energy density by lithium (Li) insertion/extraction in a non-aqueous electrolyte. However, as noted above, such energy storage systems are manufactured and supplied as single products. This requires the distributor to stock multiple SKU's to meet a variety of applications, that is, multiple modules having various combinations of LIB and SC components within the housing.

It is proposed herein to provide the LIB and the SC components in modular form. By providing the LIB and the SC in modular form, meaning each of the LIB and the SC is in a separate sub-module, the distributor is able to carry a much smaller inventory while meeting the needs of all applications. All that is required is for the distributor to select the desired battery and capacitor combination and connect them together to form a single power module.

In addition, once the sub-modules are selected, the operator may place between four and twelve of the connected sub-modules 500, in series, to form the power module 100. It is noted that even though the super capacitors are in separate sub-modules, when they are placed with a series of sub-module pairs, they will still need to be electrically balanced. Otherwise, too much voltage may go to only one or two of the super capacitors. Balancing may be done by using an active balance on the side where the super capacitors are located. Alternatively, balancing may be done through a connector that runs between the super capacitors and the batteries. This may be, for example, a part of the electrical connectors 518, 528.

Figure 9A:
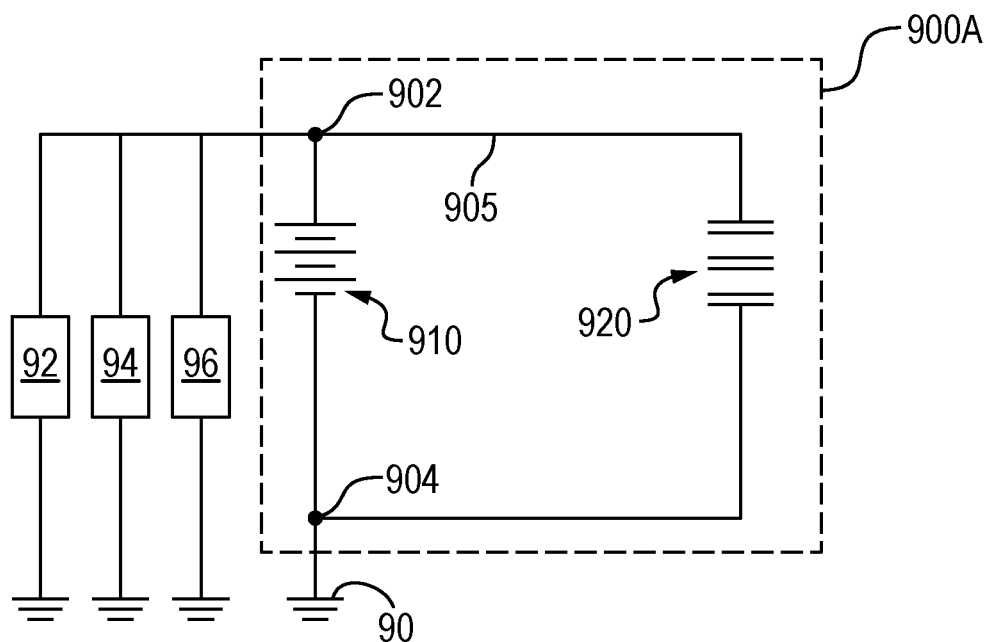
FIG. 9A is circuit diagram showing placement of the energy storage device into an electrical system, in a first embodiment.

FIG. 9A is circuit diagram showing placement of the energy storage device 500 into an electrical system 900A, in a first embodiment. The electrical system 900A may be an automobile, a truck, a refrigeration system, or any other system requiring electrical energy to run.

In the arrangement of FIG. 9A, the circuit diagram includes circuitry 905. The circuitry 905 includes two external terminals 902, 904. Terminal 902 represents a positive terminal while terminal 904 represents a negative or ground terminal (indicated at 50). The two-terminal energy storage device 900 can be configured to replace a standard two-terminal OEM battery.

A battery 910 is shown connected between terminals 902 and 904. Also, a capacitor 920 is shown connected between terminals 902 and 904. The battery 910 and the capacitor 920 are placed in parallel.

When used with an automobile or truck or motorcycle, the energy storage device 500 can be electrically connected to one or more vehicle loads. For example, the device 500 can be connected to a starter 92 and to a power supply 94 used to charge the device 500 as the vehicle is being driven. The power supply 94 may be an alternator. Other power supplies can be implemented instead of or in addition to alternator 94 such as a charging station for an electric or hybrid vehicle.

Embodiments of the device 500 allow both the battery 910 and the capacitor 920 to be charged from a power supply, such as the alternator 94, and also supply power to a vehicle system, such as the starter 92, or to a refrigeration system 250. In a preferred vehicle application, both the battery 910 and the capacitor 920 are charged from the alternator 94 with a charge voltage.

Those of ordinary skill in the art will understand that the battery 910 will maintain a high state of charge while connected to the alternator 94 or other power supply. Upon being disconnected from the power supply, the state of charge of the battery 910 will begin to dissipate. Voltage drops in the battery 910 can reduce the battery's life, preventing the battery 910 from providing a reliable starter crank.

Providing a capacitor 920 in parallel with the battery 910 allows the capacitor 920 to mitigate against starter crank problems. The circuitry 905 of FIG. 9A allows a bi-directional flow between the battery 910 and the capacitor 920.

This provides a system wherein the capacitor 920 is configured to "re-charge" the battery 910 when the state of charge and voltage in the capacitor 920 is higher than the battery 910. The increased cycle efficiency of the capacitor 920 can also allow the capacitor 920 to increase the life of the battery 910. In addition, the efficient charge acceptance and discharge rate of the capacitor 920 can allow the capacitor 920 to mitigate some of the spikes and drops in power typical during operation of the device 500, such as during cranking or during operation of the refrigeration system 250.

Figure 9B:
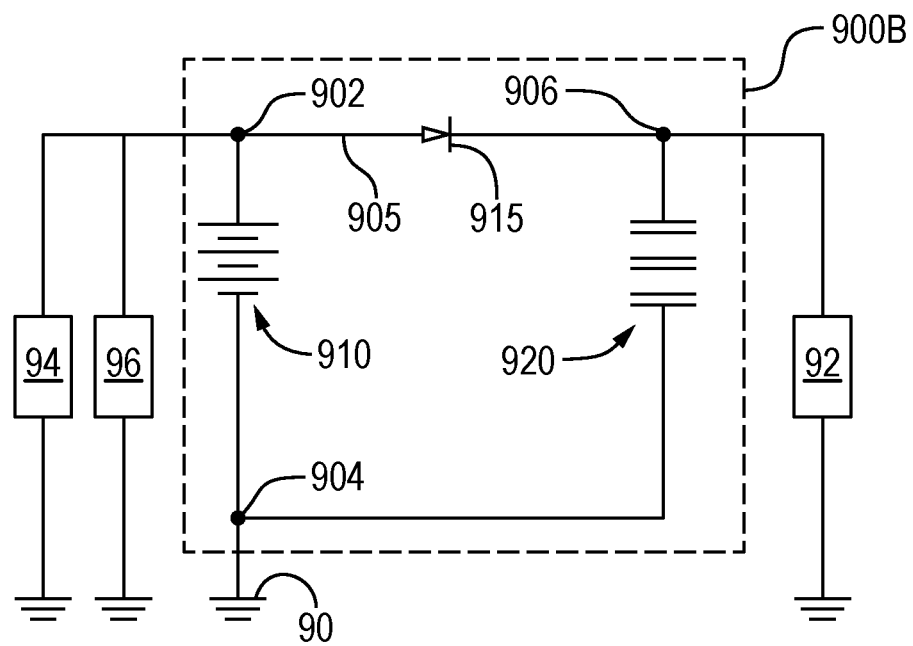
FIG. 9B is circuit diagram showing placement of the energy storage device into an electrical system, in a second embodiment.

FIG. 9B is circuit diagram showing placement of the energy storage device 500 into an electrical system 900B, in a second embodiment. The electrical system 900B is generally similar to the electrical system 900A described above. However, in this instance a third terminal 906 is provided as part of the circuitry 905.

In the circuitry arrangement of FIG. 9B, terminal 902 comprises a first positive terminal. This terminal 902 is connect with the alternator 94. Terminal 906 comprises a second positive terminal that is connected with the starter 902. This arrangement allows the starter 92 to be electrically configured on the same terminal of the device 500 as, for example, the capacitor 920. Additionally, the alternator 94 may be electrically connected with the same terminal as the battery 910.

In FIG. 9B, a rectifier 915 is positioned between the alternator terminal 902 and the starter terminal 906. The rectifier 915 may comprise, for example, a diode, a synchronous rectifier, or a transistor. The rectifier 915 allows current flow from the alternator 94 to the capacitor 920, allowing the capacitor 920 to be charged while preventing or reducing current flow from the capacitor 920 to terminal 902 and battery 910. Such an embodiment can at least partially electrically isolate the capacitor 920 from the battery 910.

The three-terminal circuity 905 of FIG. 9B isolates the capacitor 920 from the battery 910 by allowing only uni-directional current flow. Such an arrangement has the benefit of allowing only the power and current stored in the capacitor 920 to be provided to the starter 92 during a start event. This also allows the capacitor 920 to supply power to high power pulse devices, such as the starter 92, allowing the battery 910 to contribute power to devices with medium or longer period demands.

In operation, the battery 910 may sometimes have an undesirable lower voltage because the battery has been accidently discharged, or has been insufficiently re-charged (such as during a start/stop event), or has been operating in a cold environment. By at least partially isolating the battery 910 and the capacitor 920 by using the rectifier 915 in a three-terminal system, the capacitor 920 can remain at a higher voltage and state of charge when the alternator 94 or other power supply is turned off, separate from the state of charge, voltage and capacity of the battery 910. Such isolation thus can also provide an overall higher energy to the starter 92 from the capacitor 920, without the limiting effects of the battery 910.

In any instance, upon assembly, the energy storage device 500 will include a positive device terminal (such as terminal 902) and a negative device terminal (such as terminal 904). The energy storage device 500 includes a battery 910 connected between the first terminal 902 and the second terminal 904. The energy storage device includes a capacitor 920 connected in parallel with the battery 910. In one optional embodiment, the energy storage device 500 includes a rectifier 915 connected between the first terminal 902 and the capacitor 920. As noted, the rectifier 915 is configured to allow substantially uni-directional current flow from the first terminal 902 to the capacitor 920. In either arrangement no switch is required or used for controlling electrical communication between the capacitor and the first terminal.

It is noted that in an alternative arrangement, a second battery may be used as part of the circuitry 915. In this arrangement, the second battery is connected in parallel with and between the first battery 910 and the capacitor 920. A first rectifier is connected in parallel with and between the first battery and the second battery, while a second rectifier is connected between the second terminal and the first rectifier. Yet a third rectifier may be connected between the first rectifier and the first terminal.

Returning to FIGS. 6 and 7, it is preferred that the body 515 for the battery 510 and the body 525 for the capacitor 520 each define a separate housing. The housings form independent "sub-modules" for the battery 510 and for the capacitor 520. When mechanically secured together and placed in electrical communication, the battery 510 and the capacitor 520 together form an energy storage device 500 in modular form.

The energy storage device 500 is intended to provide electrical power for a mechanical object. For example, the energy storage may provide electrical energy to a starter for a car or a boat. In the present inventions, the mechanical object may be a car, a truck or a marine vessel. Alternatively, the mechanical device may be a jet ski or a so-called four-wheeler. Alternatively still, the mechanical device may be an air conditioning unit used for a refrigeration truck or for a rail car.

Figure 10A:
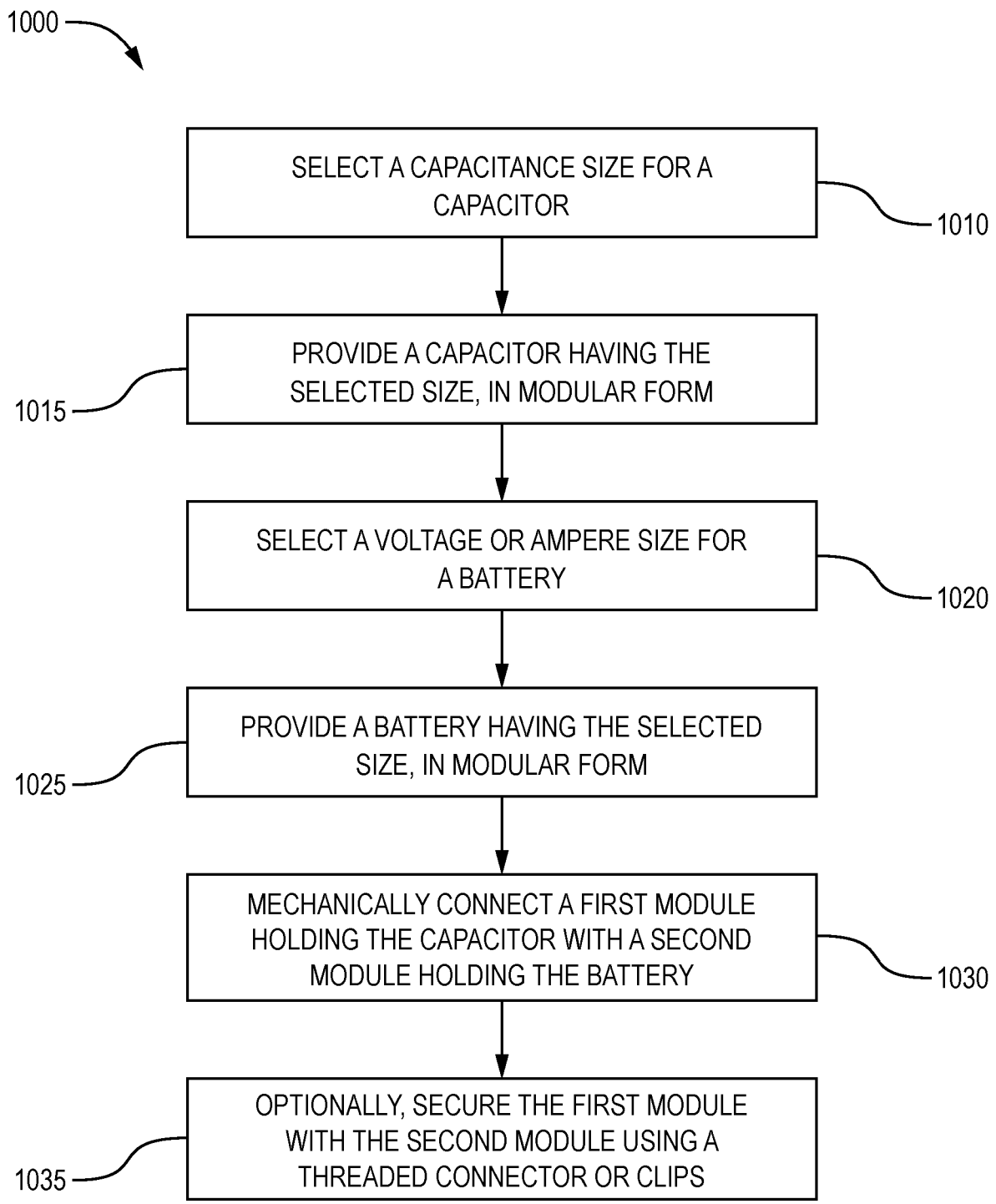
FIGS. 10A and 10B represent a single flow chart showing steps for performing the method of forming a charge storage device for a refrigerated trailer, in one embodiment.
Figure 10B:
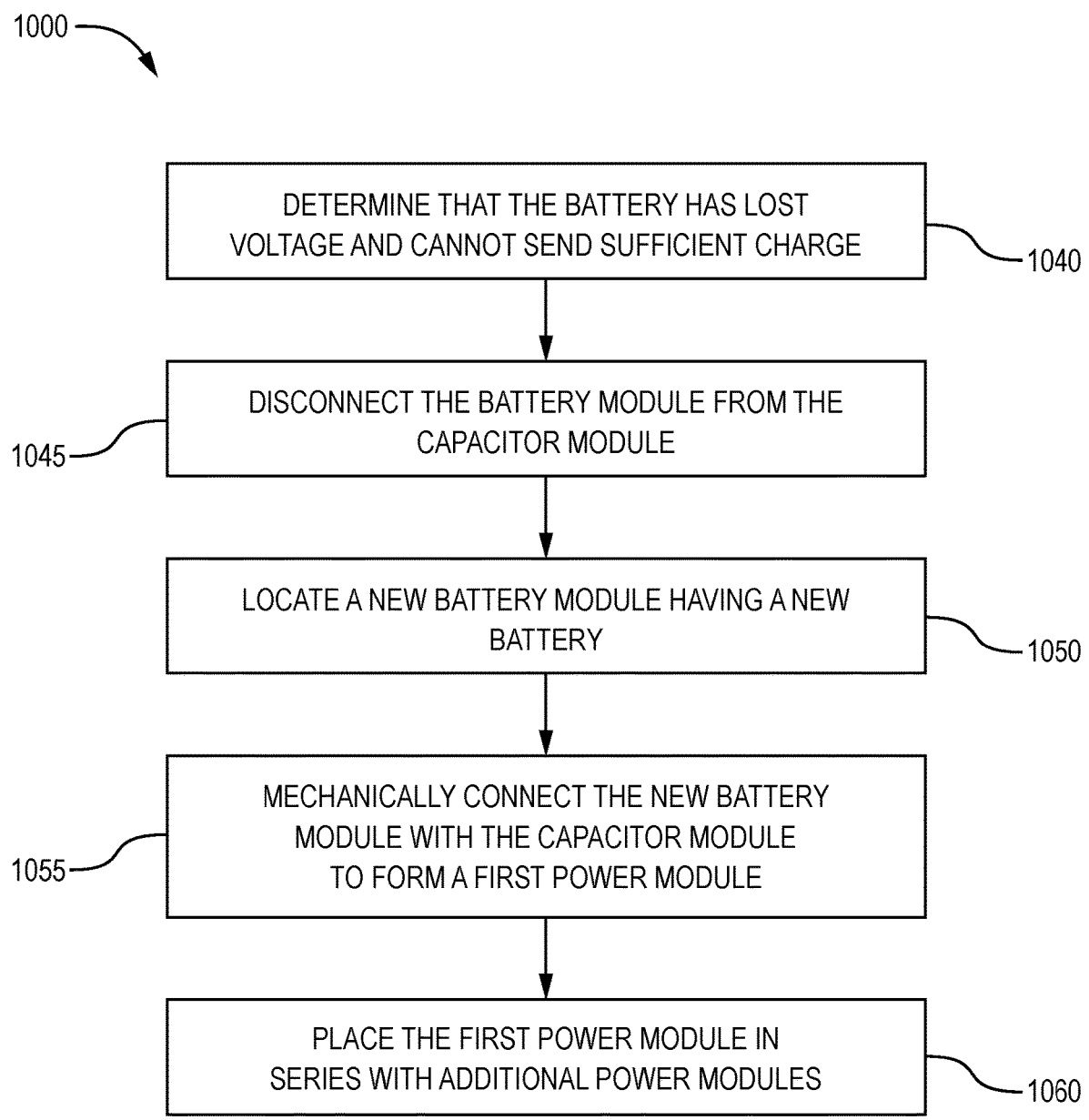

Using the energy storage device 500, a method of forming a charge storage device is provided herein. FIGS. 10A and 10B present a flow chart showing steps for a method 1000 of forming a charge storage device, in one embodiment.

In one aspect, the method 1000 first comprises selecting a size for a capacitor. This is shown in Box 1010 of FIG. 10A. In this instance, "size" refers to capacitance, or storage potential. The method 1000 then includes providing a capacitor having the selected size, in modular form. This is seen in Box 1015. It is understood that the capacitor may be a bank of capacitors depending on the amount of stored electrical energy that is needed.

The method 1000 also includes selecting a size for a battery. This is indicated in Box 1020. Preferably, the battery is a lithium battery. The lithium battery may be a lithium-ion battery, a lithium-iron phosphate battery, a lithium-cobalt oxide battery, a lithium-nickel manganese cobalt oxide battery, a lithium-manganese oxide battery, a lithium titanate battery, or any other lithium battery suitable for providing electrical power to a mechanical device.

The method 1000 then includes providing a battery having the selected size. This is provided in Box 1025. Preferably, the battery is also in modular form.

In one embodiment of the method 1000, the capacitor resides within a first sub-module while the battery resides within a second sub-module. The term "module" refers to an independent housing holding an electrical device. The first sub-module has a mechanical connector portion and an electrical connector. Similarly, the second sub-module has a mechanical connector portion and an electrical connector.

The method 1000 additionally includes mechanically connecting the first sub-module and the second sub-module by connecting the mechanical portion of the battery to the mechanical portion of the capacitor. This is done while simultaneously connecting the electrical connector of the capacitor with the electrical connector of the battery. This is provided in Box 1030.

Preferably, the electrical connector of the capacitor and the electrical connector of the battery are mated through a male-female connection, and with a threaded connector. This is shown in box 1035. In any instance, the first sub-module and the second sub-module are combined to form a hybrid energy storage device, preferably without need of wires or busbars. The hybrid energy storage device comprises a first device terminal and a second device terminal. The battery is connected between the first device terminal and the second device terminal, while the capacitor is connected in parallel with the battery.

In one embodiment, a rectifier is provided for the energy storage device. The rectifier is connected between the first device terminal and the capacitor. The rectifier is configured to provide uni-directional current flow from the first device terminal to the capacitor.

As an alternative to the rectifier, the energy storage device may include a current limiter. The current limiter is connected between the first device terminal and the capacitor and acts as a resistor. In this respect, the current limiter is configured to limit current flow from the first device terminal to the capacitor. In one function, the current limiter is configured to reduce current draw from the batter when the capacitor powers an external device. The current limiter may comprise at least one of a positive-temperature-coefficient resistor and a resistive bridge.

The current limiter is preferably used in lieu of the rectifier 915 in FIG. 9B. Alternatively, the current limiter may be connected in series between the rectifier and the capacitor.

It is observed that a battery 510 as could be used in the energy storage device 500 may only have up to 2,000 charge cycles. Further, the battery 510 may be susceptible to losing voltage if it is left unused for several weeks or if it is exposed to extreme cold temperatures. In such instances, the battery 510 (in its modular form) would have to be replaced even before it reaches 2,000 charge cycles.

At the same time, it is observed that a capacitor 520 as could be used in the energy storage device 500 may have up to one million charge cycles. Further, the capacitor 520 is virtually immune to the effects of cold at levels that are detrimental to a battery 510 and can store charge for off-peak hours. Thus, the capacitor 520 will far outlast the battery 510. Thus, as part of the method 1000, steps may additionally be taken as follows:

determining that the battery has lost sufficient voltage to start an engine (or to charge the capacitor) [shown in Box 1040 of FIG. 10B];
disconnecting the first module from the second module [provided in Box 1045];
locating a new second module having a new battery, wherein the second module also has a mechanical connector portion and an electrical connector [indicated at Box 1050]; and
mechanically connecting the first module to the new second module while simultaneously connecting the electrical connector of the capacitor with the electrical connector of the new battery [seen in Box 1055].

This allows a new charge storage device to be provided without throwing out the capacitor.

As an additional step, a series of mechanically- and electrically-connected sub-modules may be placed in series. This is shown in the step Box 1060. Four to twelve pairs of sub-modules may be used to form a hybrid energy power module such as for a refrigerated trailer. It is understood that for purposes of the present disclosure, the term "refrigerated trailer" may include not only an over-the-road reefer, but also a refrigerated intermodal container or a refrigerated rail car.

Further, uses and variations of the hybrid energy storage device may fall within the spirit of the claims, below. For example, in yet another alternative embodiment the battery and the capacitor are not separate modules, but instead each resides in the same housing. In this instance, mechanical connectors for the separate housings are not needed since the battery and the capacitor are already housed together.

In this arrangement, the housing will have a base, a removable top and a plurality of side walls. A user may access the electronics for the energy storage device by removing the top. In this instance, the "top" may represent covers 112, 122 as an integral piece. The power module 400 is representative of such an arrangement.

As a part of the alternative method, a user may determine that the battery portion of an energy charge device has become depleted or is otherwise incapable of delivering sufficient voltage to cause the starter to crank the engine. This may be due to an inactive state of the engine for a period of time. For example, it is not uncommon for the battery of a jet ski or a motorcycle or a four-wheeler to "go dead" over the winter or otherwise if it is not activated at least every few weeks. Jet ski batteries are notorious for having to be replaced each spring after sitting idle for months, including during a cold winter.

When this occurs, the user need not replace the entire charge storage device; rather, the user may replace only the battery portion, or "lithium half" (assuming that the old battery portion cannot be re-charged). In this instance, the user removes the top from the housing, removes the battery from the housing, replaces the old battery with a new one, and then returns the top (or lid) to the housing of the charge storage device.

This same concept of servicing may be applied in the step of Box 1065. In this respect, the operator may identify one or two batteries out of a bank of batteries that need to be replaced. In this instance, the depleted battery modules may be disconnected from the power module 100, and replaced. The new battery modules are mechanically and electrically connected to their respective capacitor modules.

The power module can be fabricated in a BCI Group 31 size. It is inherently less sensitive to road vibrations that traditional wet cell batteries. The power module has a minimal risk of acid damage compared to lead acid batteries and, other than periodically replacing battery sub-modules, is maintenance free.

It will be appreciated that the inventions are susceptible to modification, variation and change without departing from the spirit thereof. For example, the power module described herein, in its various embodiments, may be used to "turn over" the engine of a portable power generator, or used to support the starting of off-road equipment, or the starting of a fleet of trucks in a yard. The power module may specifically support combustion engine generators used for portable heaters, lights and blowers. This may be in support of remote military operations, remote rescue operations, humanitarian relief efforts, remote scientific research and data gathering, and emergency services.

What is claimed is:

1. A power generation system for a mobile electrical device, comprising:
   a combustion engine serving as a power generator for the mobile electrical device, with the combustion engine being located on a trailer; and a power module comprising an ultra-capacitor and a battery;

wherein:
the ultra-capacitor and the battery reside together within a housing having a first device terminal and a second device terminal, thereby forming the power module;
the ultra-capacitor and the battery reside together within the housing, in parallel, on the trailer;
the ultra-capacitor comprises a bank of super capacitors;
the battery comprises a bank of batteries;
each super capacitor in the bank of super capacitors is connected in parallel to a battery in the bank of batteries, forming pairs of super capacitors and batteries as the power module, with the pairs being placed in series within the housing;
the ultra-capacitors in the bank of super capacitors are electrically balanced;
the power module is configured to be electrically supported by an alternator of a vehicle, and comprises a current control configured to limit current that enters the ultra-capacitor; and
the power module is in electrical communication with the combustion engine to provide starting power.

2. The power generation system of claim 1, wherein:
the vehicle is a truck;
the trailer is an over-the-road trailer configured to be pulled by the truck;
the truck has an electrical system comprising a vehicle battery and the alternator; and
the ultra-capacitor is in electrical communication with and is charged by the alternator.

3. The power generation system of claim 2, wherein:
the ultra-capacitor is in electrical communication with the alternator by means of electrical cables that extend from the truck.

4. The power generation system of claim 3, wherein the current control comprises at least one of a positive-temperature-coefficient resistor and a resistive bridge.

5. The power generation system of claim 3, wherein the mobile electrical device is one or more lights, one or more heaters, or one or more blowers configured to be transported on the trailer.

6. The power generation system of claim 3, wherein the battery is a bank of Lithium-Ion batteries or a bank of Nickel-Metal Hydride batteries.

7. The power generation system of claim 3, wherein:
the mobile electrical device is a refrigeration system on the trailer, with the refrigeration system comprising:
a cooling unit comprising an evaporator having a network of fins and coils;
a compressor for moving the refrigerant through the fins and coils of the cooling unit;
an air handling unit comprising a fan driven by a shaft, and configured to move air across the fins and coils of the evaporator;
and wherein the combustion engine is configured to supply energy to both the cooling unit and the air handling unit to cool the trailer.

8. The power generation system of claim 7, further comprising:
a DC/DC boost converter within the power module, wherein the DC/DC boost converter is configured to boost voltage from 8 volts DC to 14.5 volts DC.

9. The power generation system of claim 8, wherein:
the DC/DC boost converter comprises an input side and an output side, with the input side being connected to the electrical cables from the alternator via the current control, and
the output side of the DC/DC boost converter being electrically connected to the bank of super capacitors.

10. The power generation system of claim 1, wherein:
the bank of super capacitors is configured to put out at least 36,000 joules of starting energy; and
each battery in the bank of batteries is a Lithium-based battery.

11. The power generation system of claim 10, wherein:
the bank of capacitors comprises between 4 and 12 ultra-capacitors, inclusive;
the bank of batteries comprises between 4 and 12 lithium-based batteries, inclusive; and
each battery in the bank of batteries serves as a voltage clamp for a corresponding ultra-capacitor so that each ultra-capacitor is balanced to a battery.

12. The power generation system of claim 11, wherein:
each of the batteries in the bank of lithium batteries has a voltage rating of 2.4 volts; and
each capacitor in the bank of ultra-capacitors has a capacitor value of at least 2,000 Farads.

13. The power generation system of claim 1, wherein:
the trailer is a refrigerated rail car pulled by a locomotive engine, with the locomotive engine being the vehicle, or the trailer is a refrigerated intermodal container carried by a ship, with the vehicle being the ship.

14. A portable refrigeration system for a trailer, comprising:
a cooling unit comprising an evaporator having a network of fins and coils;
a compressor for moving the refrigerant through the fins and coils of the cooling unit;
an air handling unit comprising a fan driven by a shaft, and configured to move air across the fins and coils of the evaporator; and
a power module comprising an ultra-capacitor and a battery;
and wherein:
the ultra-capacitor and the battery reside together within a housing having a first device terminal and a second device terminal, thereby forming the power module;
the ultra-capacitor and the battery reside together, in parallel;
the ultra-capacitor comprises a bank of super capacitors;
the battery comprises a bank of batteries;
each super capacitor in the bank of super capacitors is connected in parallel to a battery in the bank of batteries, forming pairs of super capacitors and batteries as the power module, with the pairs being placed in series within the housing;
the ultra-capacitors in the bank of super capacitors are electrically balanced;
the power module is configured to supply energy to both the cooling unit and the air handling unit to cool the trailer; and
the cooling unit, the compressor, the air handling unit and the power module reside together on the trailer.

15. The refrigeration system of claim 14, wherein:
the trailer is an over-the-road trailer configured to be pulled by a truck;
the truck has an electrical system comprising a vehicle battery and an alternator;
the ultra-capacitor is in electrical communication with the alternator by means of electrical cables that extend from the truck; and
the power module further comprises a current control configured to limit current that enters the ultra-capacitor.

16. The refrigeration system of claim 15, further comprising:
a combustion engine configured to provide power to the cooling unit and the air handling unit, with the combustion engine also residing on the trailer;
and wherein:
supplying energy to both the cooling unit and the air handling unit means that the power module provides starting power to the combustion engine;
and
the battery comprises a bank of lithium batteries or a bank of Nickel-Metal Hydride batteries.

17. The refrigeration system of claim 16, wherein:
the bank of capacitors comprises between 4 and 12 super capacitors, inclusive; and
the bank of batteries comprises between 4 and 12 Lithium-based batteries, inclusive.

18. The refrigeration system of claim 17, wherein:
each of the lithium batteries in the bank of lithium batteries has a voltage rating of 2.4 volts; and
each super capacitor in the bank of super capacitors has a capacitor value of at least 3,000 Farads.

19. The refrigeration system of claim 17, wherein the power module comprises six pairs of lithium batteries and super capacitors.

20. The refrigeration system of claim 17, further comprising:
a DC/DC boost converter within the power module, wherein the DC/DC boost converter is configured to boost voltage from 8 volts DC to 14.5 volts DC;
and wherein:
the DC/DC boost converter comprises an input side and an output side, with the input side being connected to the electrical cables from the alternator via the current control; and
the output side of the DC/DC boost converter is electrically connected to the bank of super capacitors.

21. The refrigeration system of claim 17, wherein:
each capacitor in the bank of super capacitors resides within a capacitor module, with each capacitor module having a mechanical connector portion and an electrical connector;
each battery in the bank of batteries resides within a battery module, with each battery module also having a mechanical connector portion and an electrical connector;
wherein:
each capacitor module defines an interchangeable capacitor unit having a selected capacitance value,
each battery module defines an interchangeable battery unit having a selected kilo-watt hour value,
each capacitor module comprises a side wall;
each battery module also comprises a side wall;
the electrical connector of each capacitor module resides on the side wall of the capacitor module;
the electrical connector of each battery module resides on the side wall of the battery module; and
the mechanical connector portion of each capacitor module and the mechanical connector portion of each battery module represent a male-female connection provided on the side walls of the capacitor module and the battery module such that pairs of capacitor modules and battery modules may be mechanically connected to form a sub-module having a defined combined voltage.

22. The refrigeration system of claim 21, wherein:
the electrical connector of each capacitor module and the electrical connector of each battery module are mechanically connected through a male-female connection provided along the side walls of the capacitor module and the battery module when the side walls of the pairs of the capacitor modules and the battery modules are placed in adjacent relation, by connecting the mechanical connector portion of the capacitor module to the mechanical connector portion of the battery module while connecting the electrical connector of the capacitor module with the electrical connector of the battery module; and
the electrical connector of the capacitor module also serves as a voltage clamp for the corresponding battery module so that each capacitor is balanced to a battery.

23. The refrigeration system of claim 21, further comprising:
a rectifier connected between the first device terminal and the capacitor of each capacitor module, with the rectifier being configured to provide unidirectional current flow from the first device terminal to the capacitor.

24. The refrigeration system of claim 21, configured such that the connection between the electrical connector of the capacitor module and the electrical connector of the battery module occurs simultaneously when making the connection between the mechanical connector of the first sub-module and the second sub-module.

25. The refrigeration system of claim 21, further comprising:
a sensor configured to sense internal resistance of the battery;
a micro-controller residing on the second sub-module, the micro-controller configured to receive signals sent by the sensor, and transmit those signals through a wireless communications system using a transceiver for remote processing or review; and
a GPS module associated with the micro-controller, wherein the transceiver is further configured to transmit GPS coordinates through the wireless communications system.

26. A method of maintaining charge for a power generation system, the method comprising:
providing a trailer configured to be pulled by a vehicle, wherein the trailer carries the power generation system, and with the power generation system comprising:
a combustion engine serving as a power generator for a mobile electrical unit; and
a charge storage device comprising an ultra-capacitor and a battery;
wherein:
the ultra-capacitor and the battery reside together within a housing having a first device terminal and a second device terminal;
the ultra-capacitor and the battery reside together within the housing, in parallel;

the ultra-capacitor comprises a bank of super capacitors;

the battery comprises a bank of batteries;

each super capacitor in the bank of super capacitors is connected in parallel to a battery in the bank of batteries, forming pairs of super capacitors and batteries as the power module, with the pairs being placed in series within the housing;

each battery in the bank of batteries serves as a voltage clamp for a corresponding ultra-capacitor so that each ultra-capacitor is balanced to a battery to prevent over-charging; and the power module is in electrical communication with the combustion engine to provide starting power; and connecting the charge storage device to an alternator on-board the vehicle, wherein the charge storage device receives energy from the alternator when an engine associated with the vehicle is running.

27. The method of claim 26, wherein:
the vehicle is a truck;
the trailer is an over-the-road trailer configured to be pulled by the truck;
the truck has an electrical system comprising a vehicle battery and the alternator; and
the ultra-capacitor is in electrical communication with the alternator.

28. The method of claim 27, wherein:
the ultra-capacitor is in electrical communication with the alternator by means of electrical cables that extend from the truck; and
the power module further comprises a current control configured to limit current that enters the ultra-capacitor.

29. The method of claim 27, wherein the mobile electrical unit comprises one or more lights, one or more heaters, or one or more blowers configured to be transported on the trailer.

30. The method of claim 27, wherein each battery in the bank of batteries is a Lithium-Ion battery or a Nickel-Metal Hydride battery.

31. The method of claim 27, wherein:
the mobile electrical unit is a refrigeration system on the trailer, with the refrigeration system comprising:
a cooling unit comprising an evaporator having a network of fins and coils;
a compressor for moving the refrigerant through the fins and coils of the cooling unit; and
an air handling unit comprising a fan driven by a shaft, and configured to move air across the fins and coils of the evaporator;
and wherein the combustion engine is configured to supply energy to both the cooling unit and the air handling unit to cool the trailer.

32. The method of claim 27, wherein:
the bank of batteries comprises a bank of Lithium-based batteries.

33. The method of claim 32, wherein a Zener diode is placed across each super capacitor, forming an active voltage clamp type balance circuit that limits the maximum voltage that each super capacitor sees during charging.

34. The method of claim 32, wherein:
the bank of capacitors comprises between 4 and 12 super capacitors, inclusive;
the bank of batteries comprises between 4 and 12 Lithium-based batteries or Nickel-Metal Hydride batteries, inclusive;
and.

35. The method of claim 34, wherein:
each of the batteries in the bank of batteries has a voltage rating of 2.4 volts; and
each super capacitor in the bank of ultra-capacitors has a capacitor value of at least 2,000 Farads.

36. The method of claim 34, wherein:
the charge storage device comprises six pairs of batteries and ultra-capacitors, forming six modules placed in series as the charge storage device.

37. The method of claim 32, wherein the vehicle is a locomotive engine and the trailer is a refrigerated rail car, or the vehicle is a ship and the trailer is a refrigerated intermodal container.

38. The method of claim 32, wherein each module comprises:
a first sub-module representing a capacitor module, with one of the ultra-capacitors of the bank of ultra-capacitors residing within the capacitor module, and the capacitor module having a mechanical connector portion and an electrical connector;
a second sub-module representing a battery module, with one of the batteries of the bank of batteries residing within the battery module, and the battery module also having a mechanical connector portion and an electrical connector;
wherein:
the capacitor module defines an interchangeable capacitor unit having a selected capacitance value,
the battery module defines an interchangeable battery unit having a selected kilo-watt hour value,
the capacitor module comprises a side wall;
the battery module also comprises a side wall;
the electrical connector of the capacitor module resides on the side wall of the capacitor module;
the electrical connector of the battery module resides on the side wall of the battery module;
the mechanical connector portion of the capacitor module and the mechanical connector portion of the battery module represent a male-female connection provided on the side walls of the capacitor module and the battery module such that the capacitor module and the battery module may be mechanically connected to form a single power module having a defined combined voltage.

39. The method of claim 38, wherein:
the electrical connector of the capacitor module and the electrical connector of the battery module are mechanically connected through a male-female connection provided along the side walls of the capacitor module and the battery module when the side walls of the capacitor module and the battery module are placed in adjacent relation, by connecting the mechanical connector portion of the capacitor unit to the mechanical connector portion of the battery unit while connecting the electrical connector of the capacitor unit with the electrical connector of the battery unit.

40. The method of claim 39, further comprising:
determining that a first battery in the bank of batteries has lost voltage;
removing the battery module for the first battery from the charge storage device;
installing a new second battery module in the charge storage device to replace the first battery module, the second battery module also comprising a side wall, and an electrical connector along the side wall of the second battery; and using the charge storage device to again provide power to the refrigeration system.

41. The method of claim 40, wherein installing the second battery comprises placing the second battery in side-by-side relation to a capacitor module, while simultaneously placing the second battery in electrical communication with the capacitor using the male-female connection of the electrical connector of the capacitor module and the electrical connector of the battery module.

42. The method of claim 41, wherein:

each of the mechanical connector portions has a through-opening configured to align and to receive a threaded connector to secure the male-female connection of the mechanical connector portions.

\* \* \* \* \*